United States Patent
Kita

(10) Patent No.: US 11,383,753 B2
(45) Date of Patent: Jul. 12, 2022

(54) TRAVELING VEHICLE

(71) Applicant: KUBOTA CORPORATION, Osaka (JP)

(72) Inventor: Yusuke Kita, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/131,883

(22) Filed: Dec. 23, 2020

(65) Prior Publication Data

US 2021/0107554 A1   Apr. 15, 2021

Related U.S. Application Data

(63) Continuation of application No. PCT/JP2019/033319, filed on Aug. 26, 2019.

(30) Foreign Application Priority Data

Aug. 31, 2018 (JP) .............................. JP2018-163388

(51) Int. Cl.
  *B62D 1/184*   (2006.01)
  *B62D 1/187*   (2006.01)

(52) U.S. Cl.
  CPC .............. *B62D 1/184* (2013.01); *B62D 1/187* (2013.01)

(58) Field of Classification Search
  CPC ...................................................... B62D 1/187
  See application file for complete search history.

(56) References Cited

U.S. PATENT DOCUMENTS

| | | | |
|---|---|---|---|
| 2,903,904 A | 9/1959 | Mackie | |
| 5,439,252 A | 8/1995 | Oxley et al. | |
| 6,460,427 B1 | 10/2002 | Hedderly | |
| 8,726,757 B2 * | 5/2014 | Barroso | B62D 1/187 74/493 |
| 2002/0024208 A1 | 2/2002 | Fujiu et al. | |
| 2005/0217407 A1 * | 10/2005 | Yamamura | B62D 1/184 74/492 |
| 2006/0021460 A1 * | 2/2006 | Schulz | B62D 1/184 74/493 |
| 2006/0151985 A1 * | 7/2006 | Li | B62D 1/184 280/775 |
| 2007/0068310 A1 * | 3/2007 | Arihara | B62D 1/184 74/493 |

(Continued)

FOREIGN PATENT DOCUMENTS

| | | |
|---|---|---|
| EP | 1 923 297 A2 | 5/2008 |
| JP | 2002-019621 A | 1/2002 |

(Continued)

OTHER PUBLICATIONS

Official Communication issued in International Patent Application No. PCT/JP2019/033319, dated Nov. 19, 2019.

*Primary Examiner* — Nicole T Verley

(74) *Attorney, Agent, or Firm* — Keating and Bennett, LLP

(57) ABSTRACT

A traveling vehicle includes a steering shaft to which a steering handle is attached, the steering shaft being adjustable in tilt angle and length, a tilt lock to lock the steering shaft at an adjusted tilt angle, a telescopic lock to lock the steering shaft at an adjusted length, and an operator including an operation area to allow locking of both of the tilt lock and the telescopic lock to be released.

8 Claims, 17 Drawing Sheets

(56) References Cited

U.S. PATENT DOCUMENTS

| | | | |
|---|---|---|---|
| 2007/0273136 A1* | 11/2007 | Cartwright | B62D 1/184 |
| | | | 280/775 |
| 2015/0259011 A1* | 9/2015 | Deckard | B62D 43/02 |
| | | | 280/781 |
| 2017/0008546 A1* | 1/2017 | Tanaka | B62D 1/189 |

FOREIGN PATENT DOCUMENTS

| | | | | |
|---|---|---|---|---|
| JP | 2004-299610 | A | | 10/2004 |
| JP | 2004299610 | A | * | 10/2004 |
| JP | 2005-001517 | A | | 1/2005 |
| JP | 2005-138825 | A | | 6/2005 |
| JP | 2008-068793 | A | | 3/2008 |
| JP | 2008143324 | A | * | 6/2008 |
| JP | 2011088546 | A | * | 5/2011 |
| JP | 2012046111 | A | * | 3/2012 |
| JP | 2016-185723 | A | | 10/2016 |
| JP | 2016185125 | A | * | 10/2016 |
| JP | 2017-087953 | A | | 5/2017 |
| JP | 2017087953 | A | * | 5/2017 |
| JP | 6487824 | B2 | * | 3/2019 |
| JP | 2019116180 | A | * | 7/2019 |
| JP | 6884689 | B2 | * | 6/2021 |

* cited by examiner

TRAVELING VEHICLE

CROSS REFERENCE TO RELATED APPLICATIONS

This application is a continuation application of International Application No. PCT/JP2019/033319, filed on Aug. 26, 2019, which claims the benefit of priority to Japanese Patent Application No. 2018-163388 filed on Aug. 31, 2018. The entire contents of each of these applications are hereby incorporated herein by reference.

BACKGROUND OF THE INVENTION

1. Field of the Invention

The present invention relates to a traveling vehicle such as a tractor.

2. Description of the Related Art

A traveling vehicle disclosed in Japanese Unexamined Patent Publication No. 2017-87953 is known.

The traveling vehicle disclosed in Japanese Unexamined Patent Publication No. 2017-87953 includes a steering shaft to which a steering wheel is attached. The steering shaft is adjustable in tilt angle as well as in length. The traveling vehicle also includes a tilt lock portion that locks the steering shaft at an adjusted tilt angle and a telescopic lock portion that locks the steering shaft to an adjusted length.

SUMMARY OF THE INVENTION

A traveling vehicle according to one aspect of a preferred embodiment of the present invention, includes a steering shaft to which a steering handle is attached, the steering shaft having a tilt angle and a length both adjustable, a tilt lock to lock the steering shaft at an adjusted tilt angle, a telescopic lock to lock the steering shaft at an adjusted length, and an operator including an operation area to allow locking of both of the tilt lock and the telescopic lock to be released.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
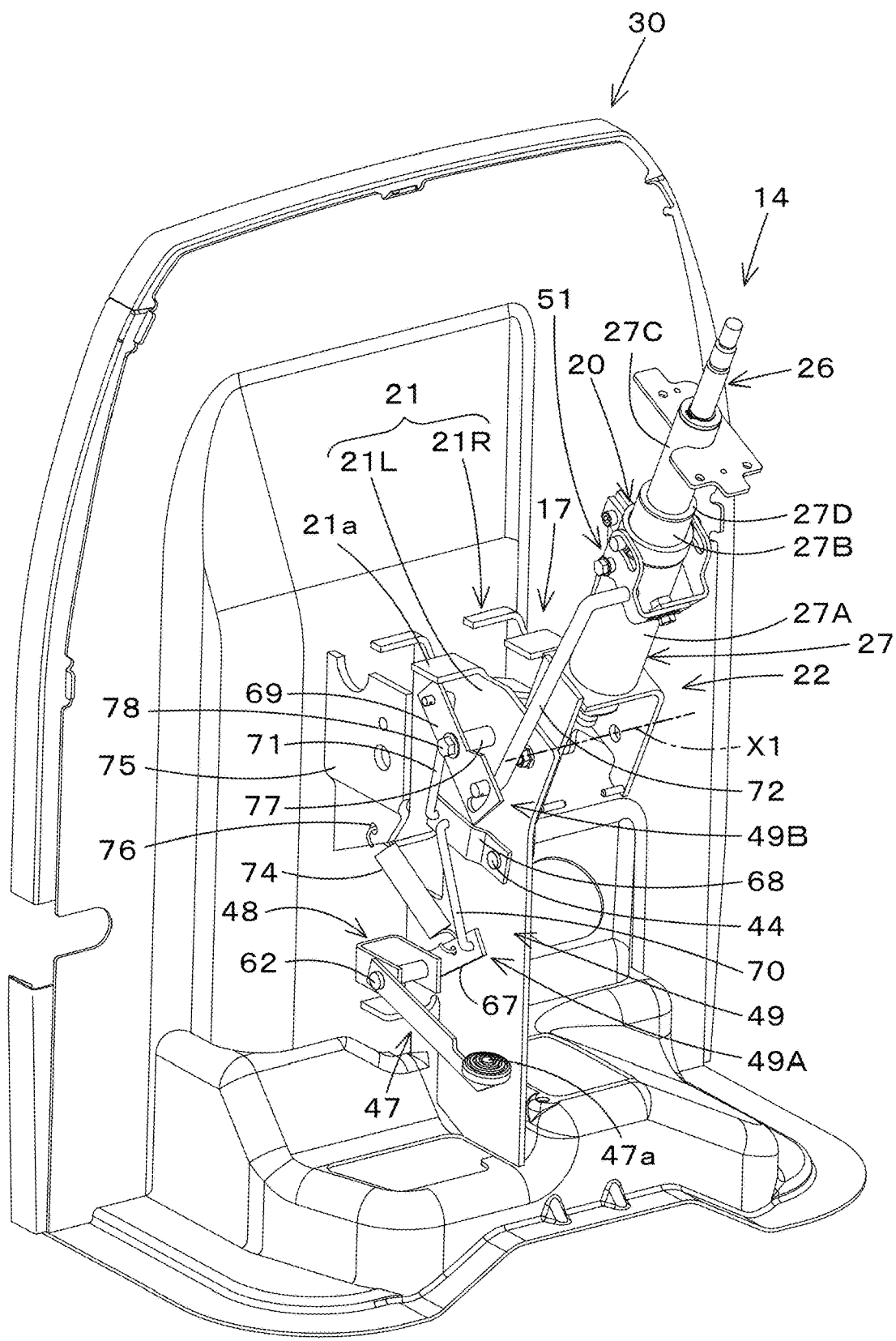
FIG. 1 is a perspective view of an operation device seen from a back surface.

The preferred embodiments of the present invention will now be described with reference to the accompanying drawings, wherein like reference numerals designate corresponding or identical elements throughout the various drawings. The drawings are to be viewed in an orientation in which the reference numerals are viewed correctly.

Hereinafter, preferred embodiments of the present invention will be described with appropriate reference to the drawings.

Figure 17:
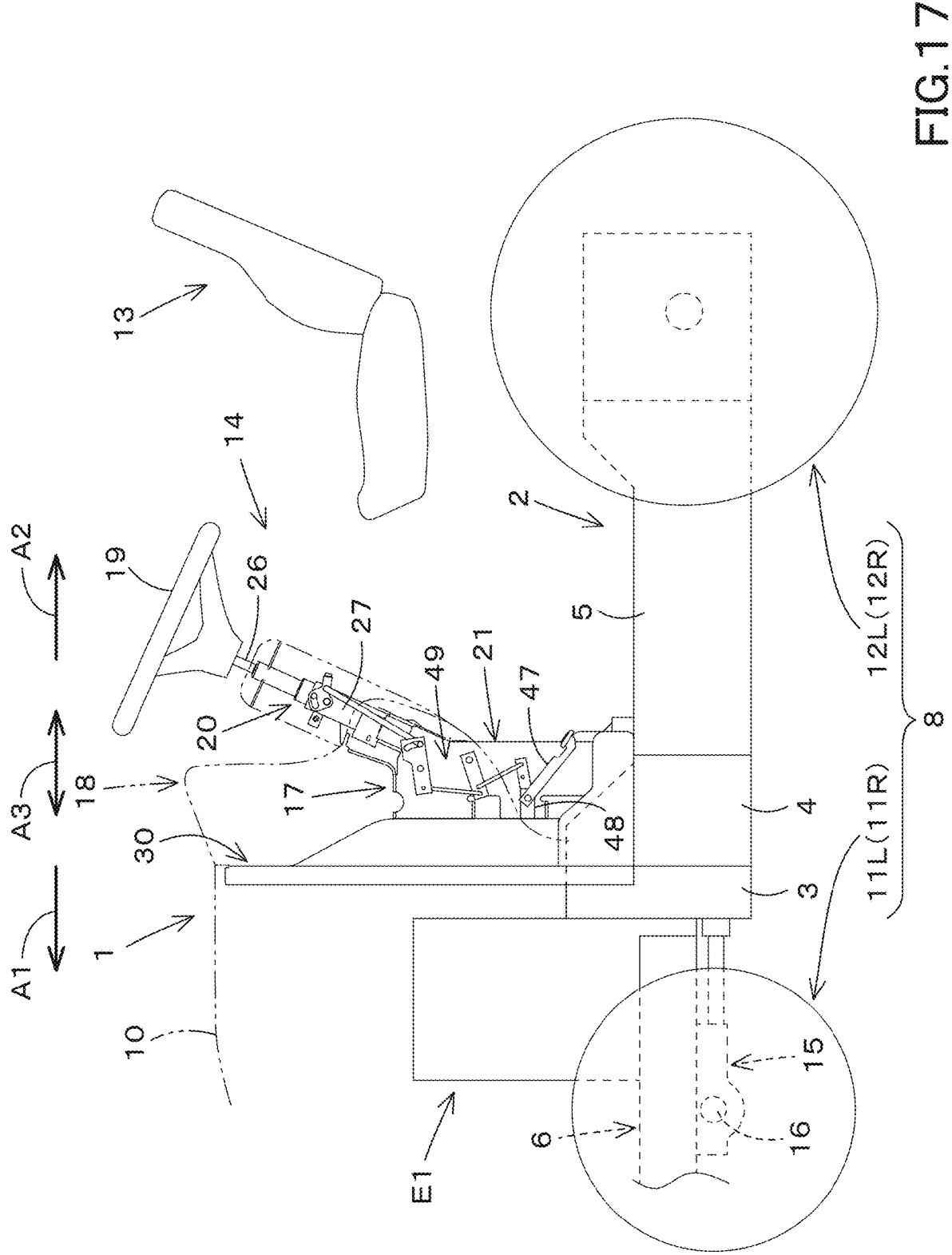
FIG. 17 is a side view of a traveling vehicle.

FIG. 17 is a schematic side view of a traveling vehicle in the present preferred embodiment. In this preferred embodiment, a tractor 1 is illustrated as the traveling vehicle.

In this preferred embodiment, a direction of an arrowed line A1 direction in FIG. 17 (a forward direction of the tractor 1) is referred to as the front, and a direction of an arrowed line A2 in FIG. 17 (a backward direction of the tractor 1) is referred to as the rear. Thus, the front surface side of FIG. 17 is referred to the left, and the back surface side of FIG. 17 is referred to the right. The horizontal direction orthogonal to the front-to-rear direction A3 is explained as a vehicle width direction. The direction from the center to the right or left portion of the vehicle width direction in tractor 1 is explained as the outside of the vehicle (also referred to as a vehicle outward direction). In other words, the vehicle outward direction is the direction in the vehicle width direction separating away from the center of the tractor 1. A direction opposite to the vehicle outward direction is explained as a vehicle inward direction (also referred to as a vehicle inward direction). In other words, the vehicle inward direction is the direction in the vehicle width direction approaching closer to the center of the tractor 1.

As shown in FIG. 17, the tractor 1 includes a vehicle body 2. The vehicle body 2 includes a prime mover E1, a flywheel housing 3, a clutch housing 4, a transmission case 5, and a front axle frame 6.

The prime mover E1 is a diesel engine. The prime mover E1 is located at the front portion of the tractor 1 and is covered by a bonnet hood 10. The prime mover E1 may be an electric motor or may be a hybrid type having a diesel engine and an electric motor.

The flywheel housing 3 is connected to the rear portion of the prime mover E1 and houses the flywheel. The clutch housing 4 is connected to the rear portion of the flywheel housing 3 and houses a clutch that intermittently transmits power of the prime mover E1 transmitted through the flywheel. The transmission case 5 is connected to the rear portion of the clutch housing 4 and houses a transmission to change the power transmitted through the clutch. The transmission includes a forward/backward switching mechanism to switch the power transmitted by the transmission between a forward traveling output or a backward traveling output.

The front axle frame 6 is fixed to the prime mover E1 and protrudes forward from the prime mover E1. A front axle case 15 is supported on the front axle frame 6.

As shown in FIG. 17, the tractor 1 includes a traveling device 8 that supports the vehicle body 2 such that the vehicle body 2 can travel. The traveling device 8 is a wheeled traveling device including a plurality of front wheels 11L and 11R on the front portion of the vehicle body 2 and including a plurality of rear wheels 12L and 12R on the rear portion of the vehicle body 2. The plurality of front wheels include a left front wheel 11L supported on the left side of the front axle case 15 and a right front wheel 11R supported on the right side of the front axle case 15. The plurality of rear wheels include a left rear wheel 12L supported on the left side of the transmission case 5 and a right rear wheel 12R supported on the right side of the transmission case 5. The traveling device 8 may be a semi-crawler type traveling device (a traveling device having a front wheel and a crawler-type traveling mechanism used in place of the rear wheel).

The left front wheel 11L and the right front wheel 11R are steerable wheels that can be steered by the movement of the cylinder rod of the steering cylinder 16 located at the front portion of the front axle case 15. By steering the left front wheel 11L and the right front wheel 11R, it is possible to change the orientation of the vehicle body 2 (the vehicle body can be steered). The steering cylinder 16 includes a hydraulic cylinder. The steering device to steer the vehicle body 2 may be a hydraulic power steering device including the steering cylinder 16 described above, or an electric power steering device that steers the front wheels 11L and 11R using the power of an electric motor, or a steering device that transmits an operation force of the steering handle 19 to the front wheels 11L and 11R with a power transmission mechanism.

At the rear portion of the vehicle body 2 is an operator seat 13 on which the driver (operator) is seated. In front of the operator seat 13, a steering device 14 is provided to steer and operate the vehicle body 2. The steering device 14 is installed on the rear portion of the support member 30, which is erected on the vehicle body 2. The support member 30 is located at the rear portion of the bonnet hood 10 and separates the interior of the bonnet hood 10 from the area where the operator seat 13 and the piloting device 14 are located.

The steering device 14 includes the steering handle 19 to steer the vehicle body 2 (the front wheels 11L and 11R), the support frame 17 supporting the steering handle 19, and the steering cover 18 covering the operation console.

Figure 2:
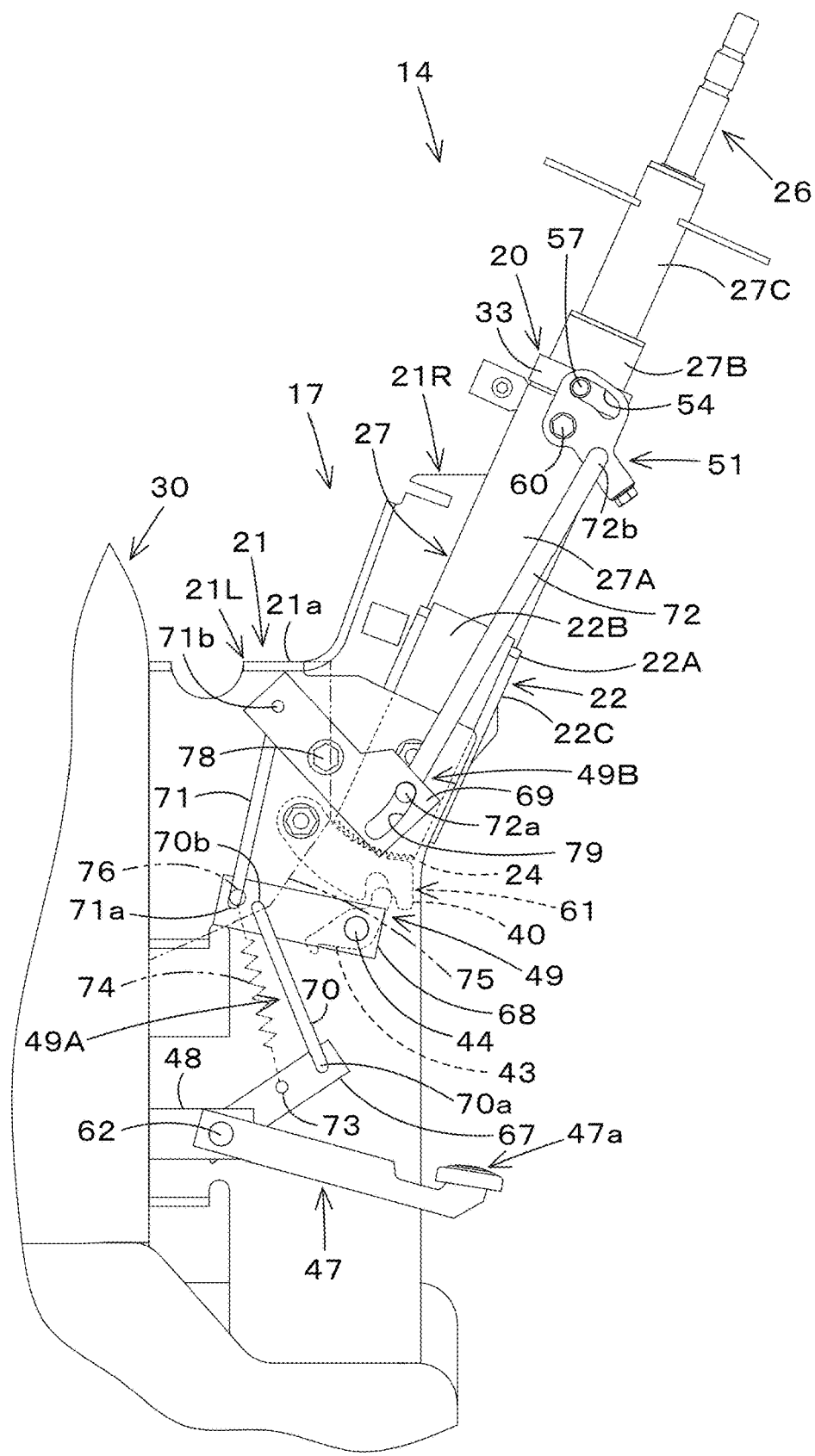
FIG. 2 is a side view of an operation device.

As shown in FIG. 1 and FIG. 2, the support frame 17 includes the fixed bracket 21 fixed to the rear portion of the support member 30 and the movable bracket 22 supported on the fixed bracket 21 that can be rotated (tilted) around an axial center extending in the vehicle width direction (a tilting axial center) X1.

Figure 3:
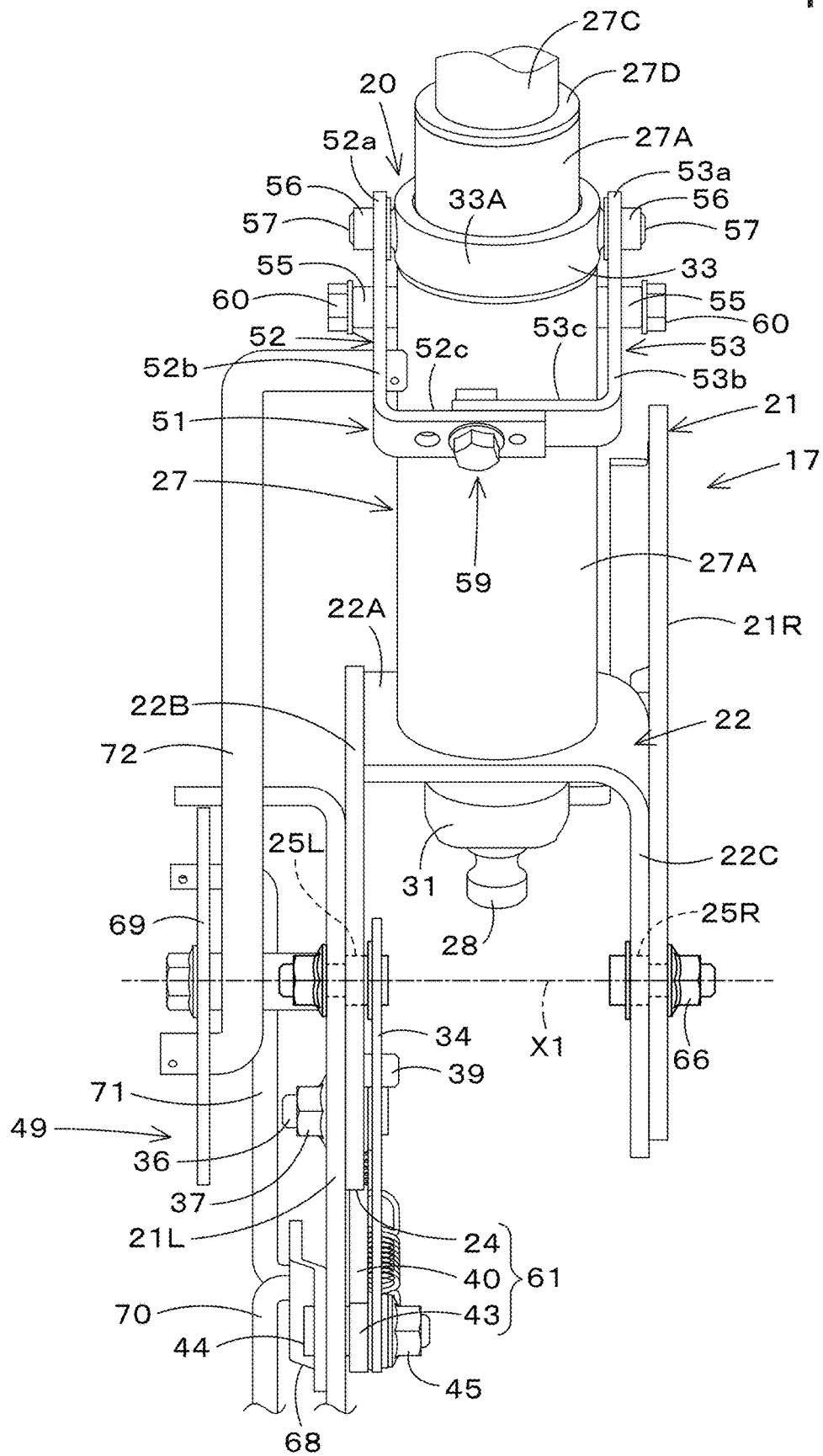
FIG. 3 is a back view of an upper portion of an operation device.
Figure 4:
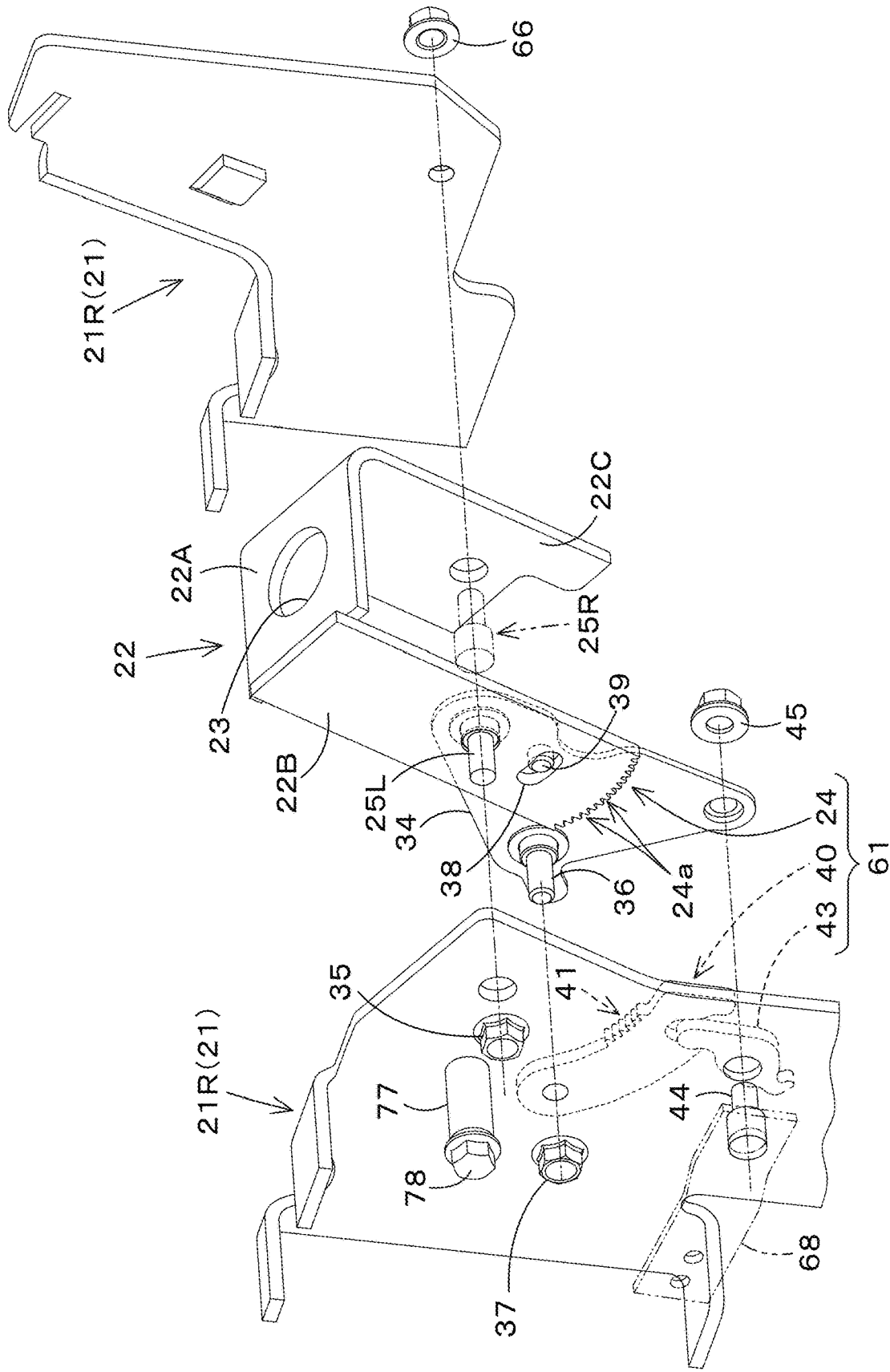
FIG. 4 is an exploded perspective view of an operation console.

As shown in FIG. 3 and FIG. 4, the fixed bracket 21 includes the first bracket 21L and the second bracket 21R. The first bracket 21L and the second bracket 21R are made of plate materials and are spaced at an interval in the vehicle width direction. As shown in FIG. 1, the first bracket 21L is elongated in the vertical direction and is fixed to the rear portion of the support member 30 and the bottom end is fixed to the bottom of the support member 30. As shown in FIG. 3, the second bracket 21R is on the right side of the upper portion of the first bracket 21L. As shown in FIG. 1, the second bracket 21R is secured to the rear portion of the support member 30.

As shown in FIG. 4, the movable bracket 22 is made of a plate material and includes an upper wall portion 22A, a first side wall portion 22B fixed to the left end portion of the upper wall portion 22A, and a second side wall portion 22C extended downwardly from the right end portion of the upper wall portion 22A. The upper wall portion 22A includes an opening portion 23. The opening portion 23 extends through the upper wall portion 22A.

Figure 5:
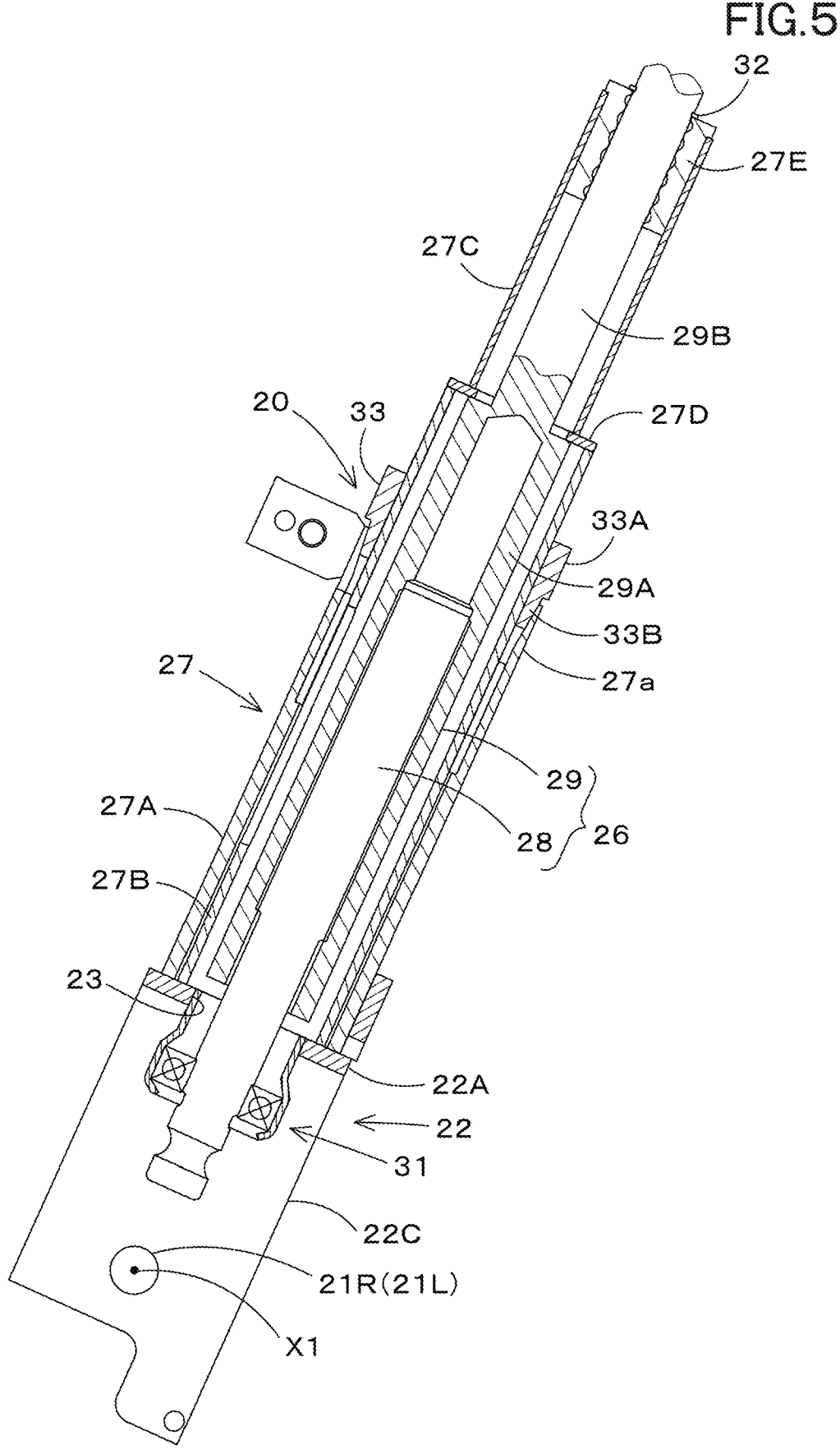
FIG. 5 is a side cross-section view of a lower portion of a steering shaft.

As shown in FIG. 2 and FIG. 5, the movable bracket 22 is provided with the steering post 27. On the steering post 27, the steering shaft 26 is supported by the steering post 27. The steering handle 19 is attached to the upper portion of the steering shaft 26 (see FIG. 17).

As shown in FIG. 5, the steering post 27 includes an outer sleeve 27A, an inner sleeve 27B, and a support cylinder 27C. The lower end portion of the outer sleeve 27A is fixed to the upper wall portion 22A. The outer sleeve 27A surrounds the opening portion 23. The inner sleeve 27B is inserted into the outer sleeve 27A. The inner tube 27B is movable in the axial direction with respect to the outer tube 27A and is not rotatable around the axis by key coupling or otherwise. An end plate 27D with a ring-disc shape is fixed to the upper end portion of the inner sleeve 27B. The bottom end portion of the support cylinder 27C is fixed to the end plate 27D. A support bushing 27E is inserted into the upper portion of the support cylinder 27C.

As shown in FIG. 5, the steering shaft 26 includes a first shaft 28 and a second shaft 29. The first shaft 28 is arranged in the inner sleeve 27B and the lower portion protrudes below the upper wall 22A through the opening portion 23. The lower portion of the first shaft 28 is rotatably supported around the axis by a bearing member 31 fixed to the upper wall 22A. The bearing member 31 includes an upper portion fixed to the inner surface of the opening portion 23 and protrudes downward from the upper wall 22A. The lower portion of the first shaft 29 protrudes downwardly from the bearing member 31, and, for example, a steering valve is connected to this protrusion via a coupling. The steering valve is a rotary valve that is operated by the steering shaft 26 to output hydraulic fluid to operate the steering cylinder 16. The steering valve may not be directly connected to the first shaft 29. For example, the steering valve may be located below the steering system 14 and interlocked with the first shaft 29 and the steering valve by a power transmission mechanism having a universal joint.

As shown in FIG. 5, the second shaft 29 includes a lower large diameter portion 29A and an upper small diameter portion 29B. The large-diameter portion 29A is provided in the inner sleeve 27B and is spline coupled to the first shaft 28. Thus, the second shaft 29 is axially movable with respect to the first shaft 28 and can be rotated integrally around the axis. In other words, the steering shaft 26 is stretchable in the axial direction and can be adjusted in length by stretching and shortening. The upper end portion of the large-diameter portion 29A is in contact with the end plate 27D. The small-diameter portion 29B protrudes upwardly from the end plate 27D and inserts the support bushing 27E. The small-diameter portion 29B is rotatably supported by the support bushing 27E around the axis. The steering handle 19 is mounted on the upper portion of the small-diameter portion 29B.

The small-diameter portion 29B regulates the downward movement with respect to the support bushing 27E with the retainer ring 32. The large-diameter portion 29A is in contact with the end plate 27D, and the upward movement is regulated by the end plate 27D. Thus, the second shaft 29 moves integrally with the inner sleeve 27B and the support cylinder 27C.

As shown in FIG. 2 and FIG. 5, the tractor 1 includes a telescopic lock portion 20 that locks the steering shaft 26 in an adjusted length. The telescopic lock portion 20 includes a locking member (referred to as the first lock member) 33 that regulates the stretching and shortening of the steering shaft 26.

Figure 6:
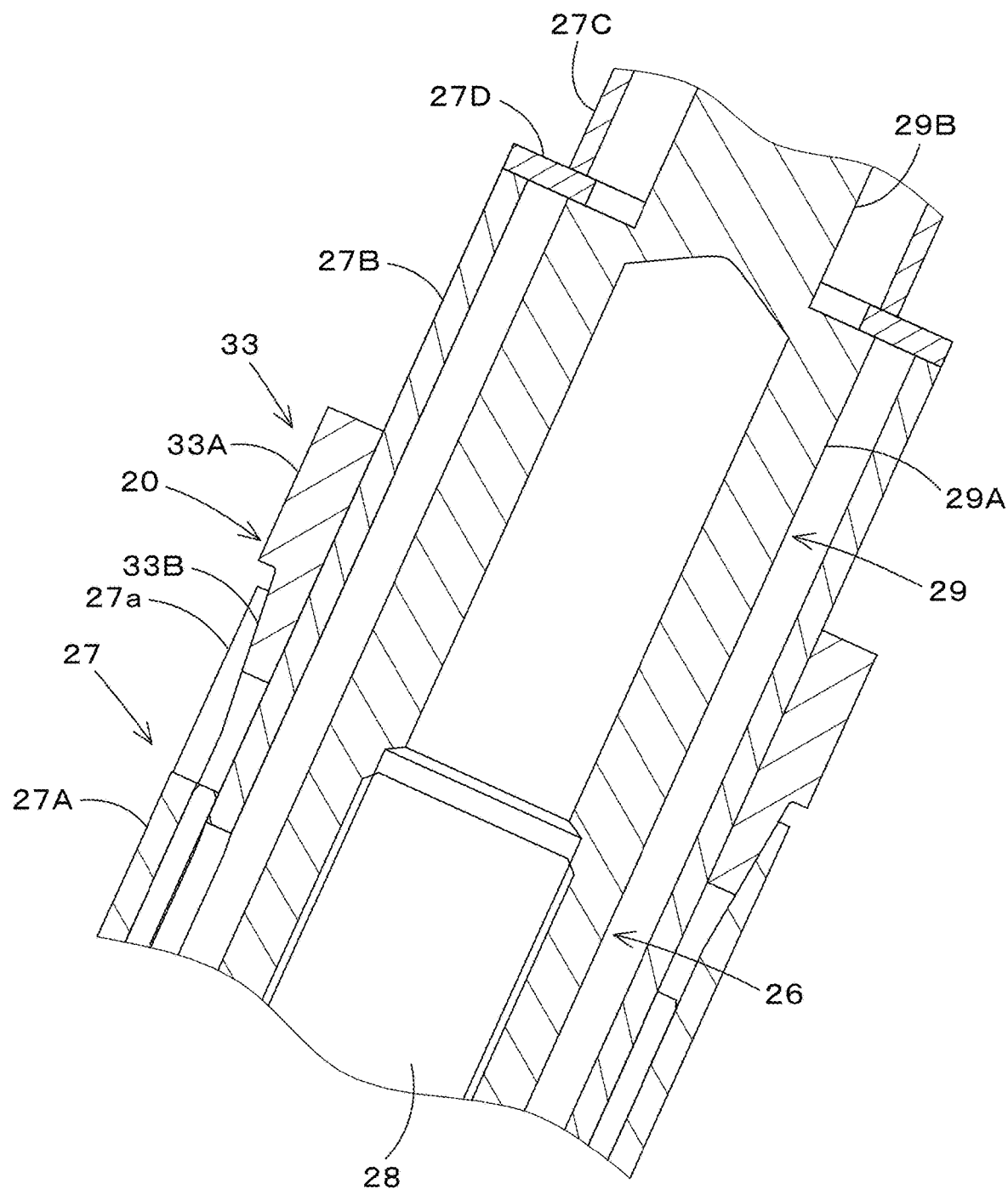
FIG. 6 is an enlarged cross-section view illustrating a state where a steering shaft is locked in an adjusted length.

As shown in FIG. 6, the first lock member 33 is provided at the upper portion of the outer sleeve 27A. The first lock member 33 preferably has a cylindrical shape and is fitted to the outside of the inner sleeve 27B in an axial direction relative to the axial direction (vertical movement is possible). The first lock member 33 preferably has a cylindrical shape with the upper portion 33A. The first lock member 33 includes the tapered portion 33B at the bottom. The tapered portion 33B is provided on a tapered surface whose outer surface shape becomes progressively smaller in diameter (gradually decreasing in diameter) as extending downwardly, and preferably has an externally cone shape.

As shown in FIG. 5 and FIG. 6, the telescopic lock portion 20 includes an insertion portion 27a with which the tapered portion 33B of the first lock member 33 engages. The insertion portion 27a is in the upper portion of the outer sleeve 27A. The insertion portion 27A is on a tapered surface whose inner surface shape becomes progressively larger in diameter (gradually enlarging in diameter) as shifting upward.

FIG. 6 shows the first lock member 33 in the locking position. In this state, the tapered portion 33B of the first lock member 33 is pushed between the insertion portion 27A and the inner sleeve 27B. Thus, in the locking position, the first lock member 33 regulates the relative movement of the outer sleeve 27A and the inner sleeve 27B by a wedge effect. This allows the steering shaft 26 to be locked to an adjusted length.

Figure 7:
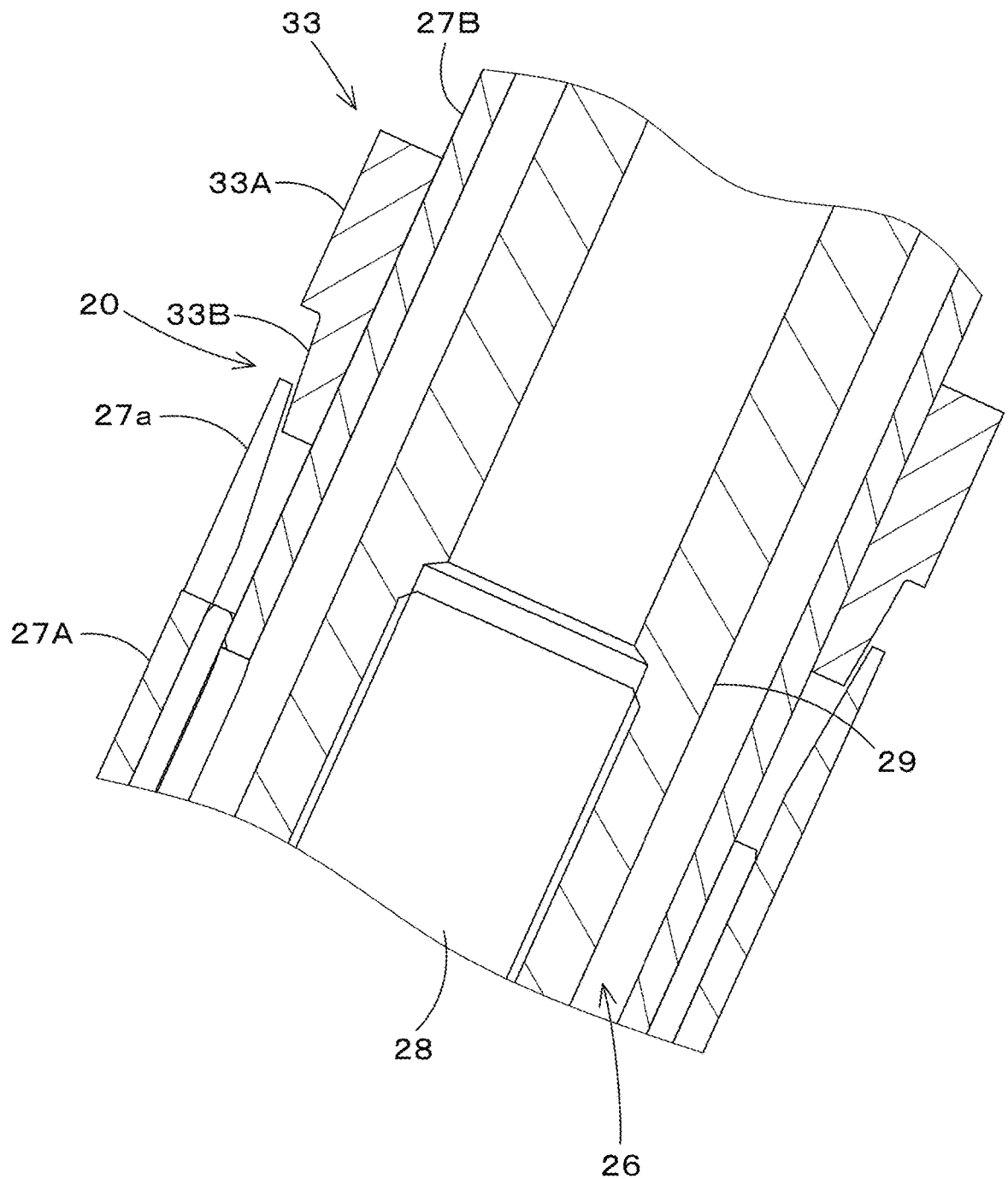
FIG. 7 is an enlarged cross-section view illustrating a state where locking of a steering shaft in a longitudinal direction is released.

FIG. 7 shows the most lifted position, which is the position at which the first lock member 33 is displaced most upwardly from the locking position. In this most lifted position, the first lock member 33 is displaced upwardly from the locking position with respect to the insertion portion 27a and the inner sleeve 27B. Thus, in the lifted position, a gap is created between the insertion portion 27A and the taper portion 33B, the wedge effect is released, and the relative movement of the outer sleeve 27A and the inner sleeve 27B is permitted. This allows the steering shaft 26 to stretch and shorten, and the length of the steering shaft 26 can be adjusted.

As shown in FIG. 4, the first side wall portion 22B is pivoted to the first bracket 21L via the first tilt shaft (a tilting shaft) 25L. In detail, the middle portion in the vertical direction of the first side wall portion 22B is supported on the upper rear side of the first bracket 21L, rotatably around the axis center of the first tilt shaft 25L (tilt axis center X1). The second side wall 22C is pivoted to the first bracket 21L via the second tilt shaft (tilting shaft) 25R. More specifically, the second tilt shaft 25R inserts the lower portion of the second side wall 22C and the rear portion of the lower portion of the second bracket 21R. The second tilt shaft 25R is detachable by screwing on a nut 66 (by fitting the screws together). The lower portion of the second bracket 21R is rotatably supported on the second bracket 21R around the axis center of the second tilt shaft 25R (tilt axis center X1).

As described above, the movable bracket 22 is rotatably supported by the first tilt shaft 25L and the second tilt shaft 25R on the fixed bracket 21 around the tilt axis X1. This allows the steering shaft 26 to tilt (incline) around the tilt axis center X1. The first tilt shaft 25L and the second tilt shaft 25R (tilt shaft) are the centers of the tilt movement (tilt motion) of the steering shaft 26, and the steering shaft 26 can be adjusted for the tilt angle (tilt adjustment) around the tilt axis center X1.

As shown in FIG. 3 and FIG. 4, a support plate 34 is provided on the inside (right side) of the first side wall portion 22B. The first tilt shaft 25L is fixed to the upper portion of the support plate 34. The first tilt shaft 25L inserts through the first side wall 22B and also inserts through the first bracket 21L. The first tilt shaft 25L is detached by a nut 35 being screwed on.

A support shaft 36 is fixed to the mid and front portion of the support plate 34 in the vertical direction. The support shaft 36 is inserted into the first bracket 21L. The support shaft 36 is detachable by a nut 37 being screwed on. The support plate 34 is fixedly attached to the first bracket 21L by the first tilt shaft 21L and nut 35 and by the support shaft 36 and nut 37.

As shown in FIG. 3 and FIG. 4, the tractor 1 includes a tilt lock portion 61 that locks the steering shaft 26 at an adjusted tilt angle. The tilt lock portion 61 includes a first engagement portion 24, a lock member (referred to as a second lock member) 40, and a lock member 43.

Figure 8:
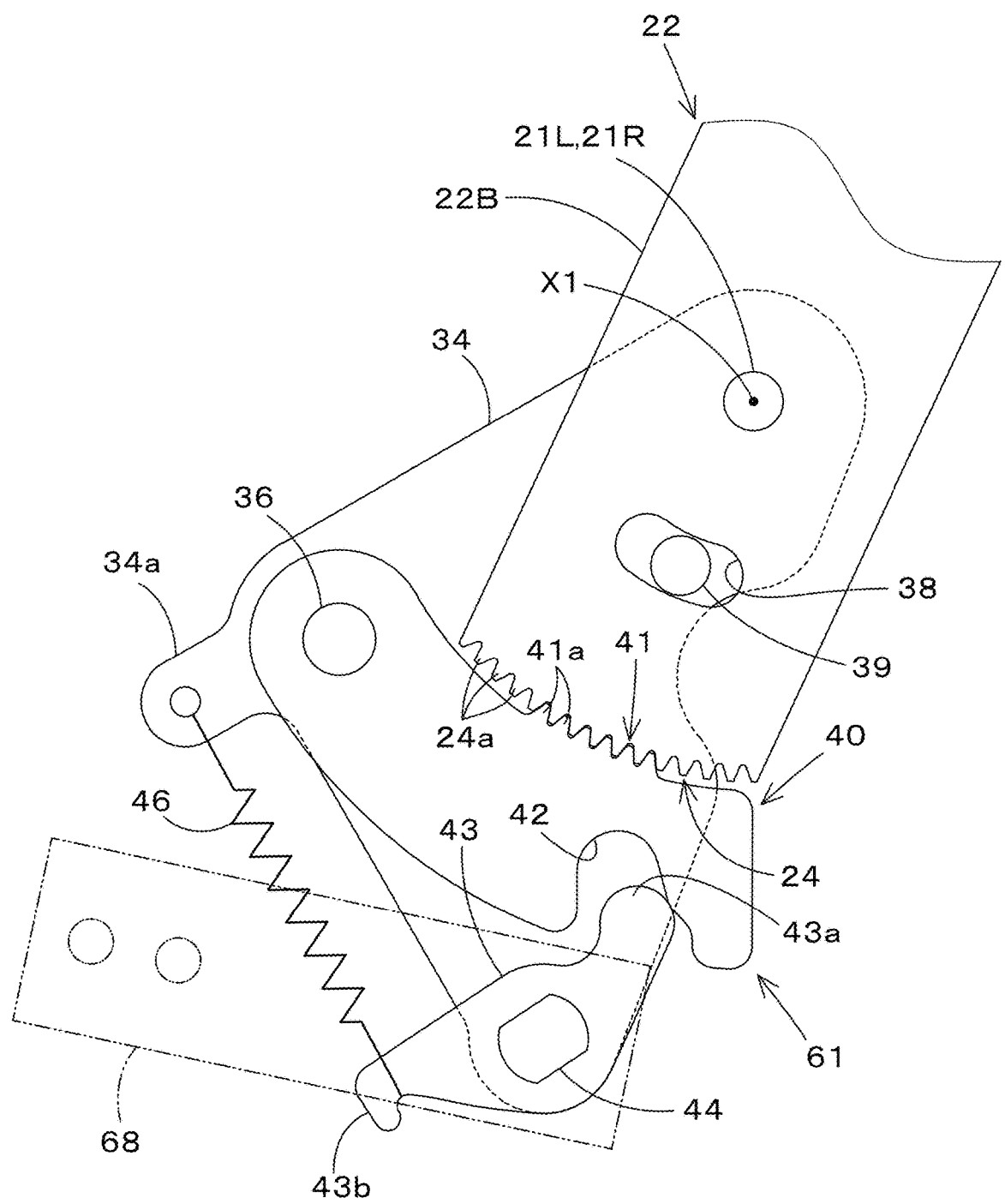
FIG. 8 is a side view of a lock portion in which a steering shaft is locked at an adjusted tilt angle.

As shown in FIG. 4 and FIG. 8, the first engagement portion 24 is at a lower end portion of the first side wall portion 22B. The first engagement portion 24 includes a plurality of engagement teeth 24a. The plurality of engagement teeth 24a are positioned in an arc direction about the tilt axis center X1. A regulator hole 38 is between the first tilt shaft 25L and the first engagement portion 24 in the first side wall 22B. The regulator hole 38 extends through the first sidewall portion 22B and is located in a long hole with an arc shape centered on the tilt axis X1. A regulator pin 39 is inserted into the regulator hole 38. The regulator pin 39 is fixed to the support plate 34. Thus, the movable bracket 22 is tiltable to the extent that the regulatory pin 39 moves relative to the regulator hole 38 from one end to the other.

As shown in FIG. 8, the second lock member 40 is below the first side wall 22B. As shown in FIG. 3 and FIG. 4, the second lock member 40 is between the first bracket 21L and the support plate 34. The second lock member 40 is rotatably supported around an axis whose front portion extends in the vehicle width direction on the support axle 36. A second engagement portion 41 with a plurality of engagement teeth 41a is provided at the top end portion of the second lock member 40. The second engagement portion 41 is capable of engaging the first engagement portion 24. The plurality of engagement teeth 41a are positioned in an arc direction around the tilt axis X1 in a state where the second engagement portion 41 is engaged with the first engagement portion 24. The engagement of the engagement tooth 24a of the first engagement 24 and the engagement tooth 41a of the second engagement 41 regulates the pivoting of the movable bracket 22 and allows the steering shaft 26 to be locked to an adjusted tilt angle.

Figure 9:
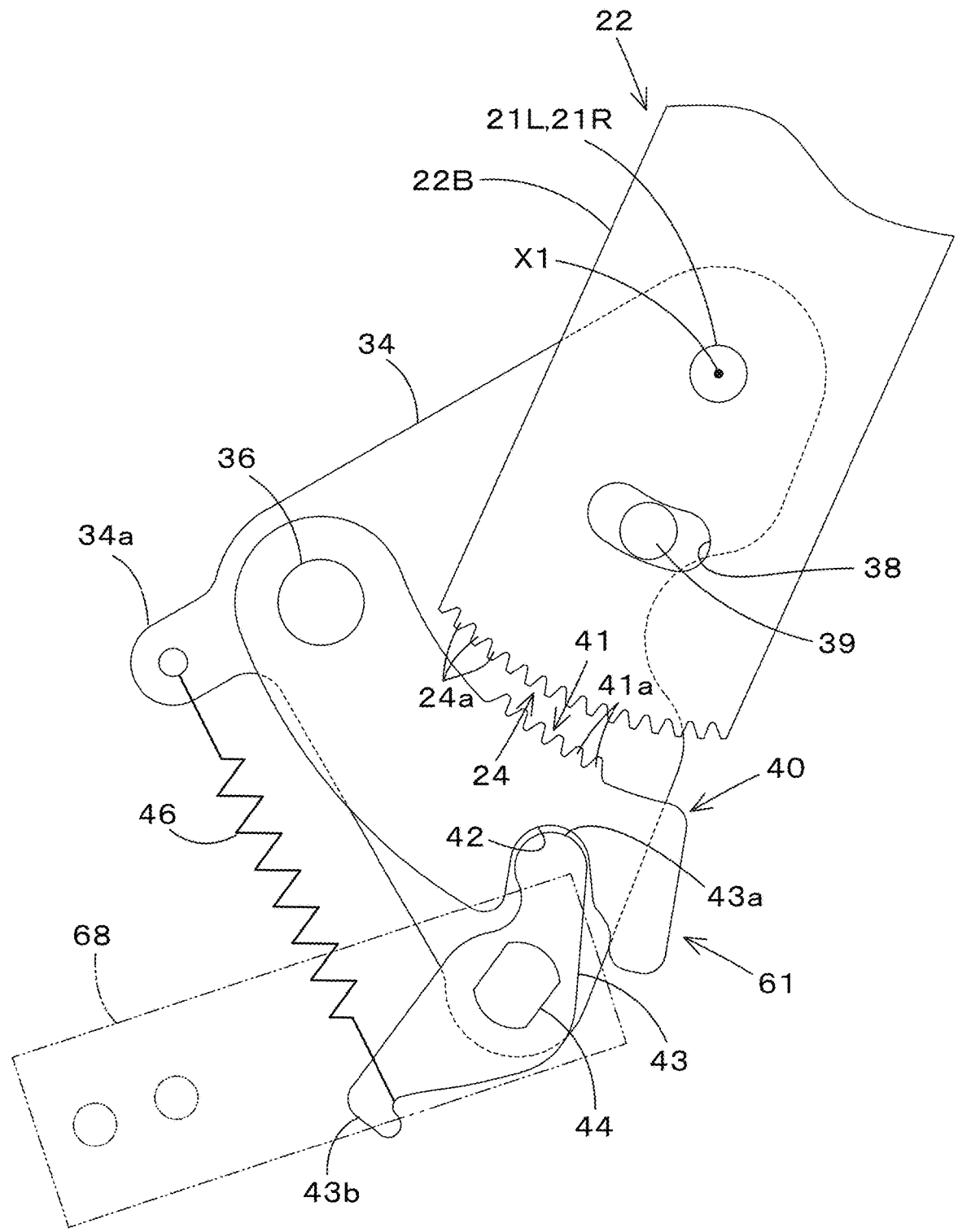
FIG. 9 is a side view illustrating a state where locking of a tilt angle of a steering shaft is released.

As shown in FIG. 9, the second lock member 40 is pivoted downward and the second engagement portion 41 is released from the first engagement portion 24, allowing the pivoting of the movable bracket 22 and allowing the tilt angle of the steering shaft 26 to be adjusted.

As shown in FIG. 8, a downwardly opening engagement groove 42 is located at the rear bottom of the second lock member 40. A lock member 43 is below the rear portion of the second lock member 40.

As shown in FIG. 4, the lock member 43 is between the first bracket 21L and the support plate 34 and is supported on a pivot shaft 44 with an axial center extending in the vehicle width direction at the midpoint. The pivot shaft 44 is fixed to the release arm 68, which will be described below, and intercepts the first bracket 21L, the lock member 43 and the first side wall 22B. The pivot shaft 44 is detached by a nut 45 being screwed on. The pivot shaft 44 is rotatable with respect to the first bracket 21L and the first side wall portion 22B. The lock member 43 is integrally rotatably fitted to the pivot shaft 44. Thus, the lock member 43 and the release arm 68 rotate integrally with the pivot axis 44.

As shown in FIG. 8, the lock member 43 includes an engaging portion 43a on the upper side and a spring-hanger portion 43b on the lower side. The engaging portion 43a is capable of engaging with the engagement groove 42. One end of a spring member 46 including a tensioned coil spring is fastened to the spring-hanger portion 43b. The other end portion of the spring member 46 is fastened to the spring-hanger portion 34a provided at the front portion of the support plate 34. The spring member 46 distributes the engagement member 43 in a direction that causes the engagement portion 43a to pivot backward.

FIG. 8 shows a tilt-locked state in which the second engagement portion 41 is engaged with the first engagement portion 24. In this tilt-locked state, the engagement portion 43a engages the lower rear surface of the engagement groove 42. This regulates the downward pivoting of the second lock member 40 and maintains the engagement of the second engagement portion 41 with the first engagement portion 24. When the release arm 68 pivots downward from this state, the engagement member 43 pivots against the force of the spring member 46 so that the engagement portion 43a moves forward, as shown in FIG. 9. The engagement portion 43a then moves out of the rear lower portion of the engagement groove 42 and toward the rear portion of the engagement groove 42. This causes the second lock member 40 to pivot downward, and the second engagement portion 41 is removed from the first engagement portion 24, allowing the tilt angle of the steering shaft 26 to be adjusted.

When the release arm 68 is pivoted upward, the second engagement portion 41 engages the first engagement portion 24 in the opposite action with respect to the above description.

As shown in FIG. 1 and FIG. 17, an operation pedal (operation member) 47 is on the side of the first bracket 21L. In detail, the operation pedal 47 is on the rear portion of the support member 30 and on the side (left side) of the lower portion of the first bracket 21L.

As shown in FIG. 2 and FIG. 3, the operation pedal 47 is linked to the tilt lock portion 61 and the telescopic lock portion by an interlocking mechanism 49 to perform the unlocking operation by the tilt lock portion 61 and the telescopic lock portion 20. That is, the unlocking operation by the tilt lock portion 61 and the telescopic lock portion 20 can be performed by a single operation pedal 47.

As shown in FIG. 1, the operation pedal 47 is supported on a bracket member (referred to as the pedal bracket) 48. The pedal bracket 48 is located to the left of the lower portion of the first bracket 21L and is fixed to the rear portion of the support member 30. The pedal bracket 48 is provided with a rotation shaft 62 having an axial center extending in the vehicle width direction that can be rotated around the axial center. The operation pedal 47 is fixed at the front portion of the operation pedal 47 so that the front portion can be rotated integrally with the rotation shaft 62. The operation pedal 47 includes a step portion 47a at the rear for an operator to step on.

As shown in FIG. 2, the interlocking mechanism 49 includes a first interlocking portion 49A, which interlocks the operation pedal 47 and the tilt lock portion 61, and a second interlocking portion 49B, which interlocks the first interlocking portion 49A with the telescopic lock portion 20.

Figure 11:
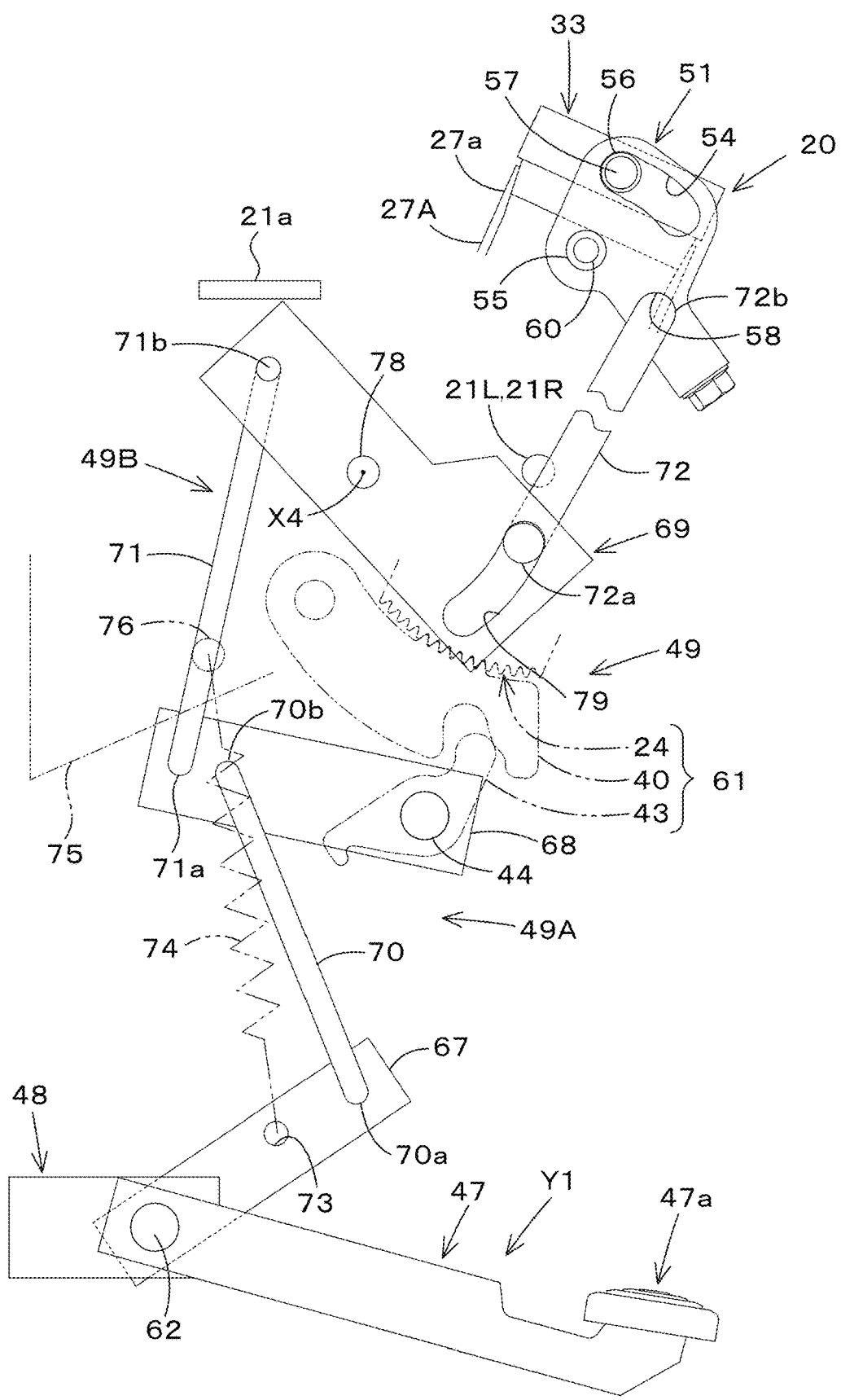
FIG. 11 is a side view of an interlocking mechanism.

As shown in FIG. 11, the first interlocking portion 49A includes an interlocking arm 67, an interlocking linkage 70, and a release arm 68.

Figure 10:
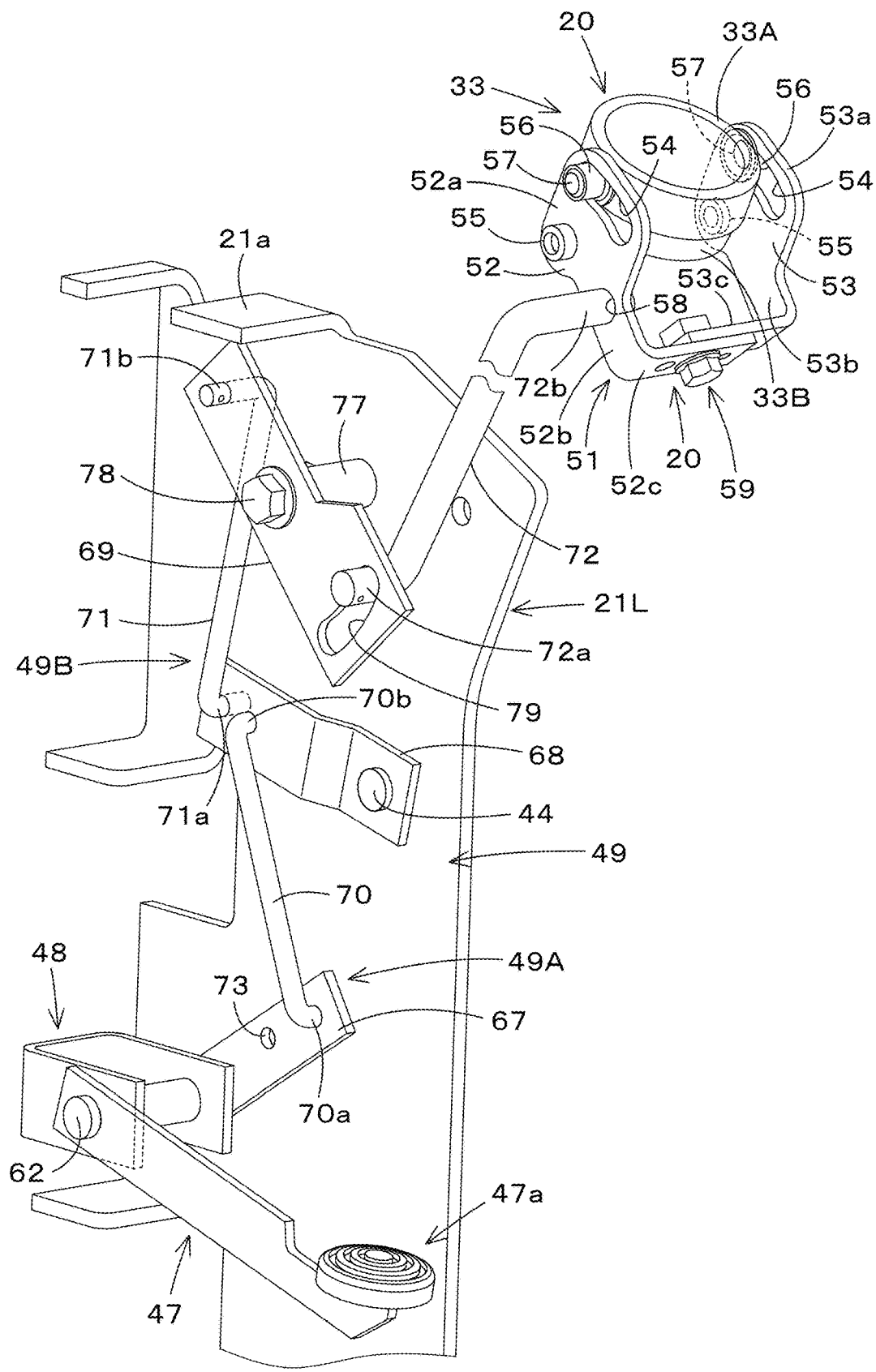
FIG. 10 is a perspective view of an interlocking mechanism.

As shown in FIG. 10 and FIG. 11, the interlocking arm 67 is connected at one end (front) to a rotation shaft 62 and is supported vertically pivotally on the pedal bracket 48 via the rotation shaft 62. Thus, the interlocking arm 67 pivots up and down in synchronization with the operation pedal 47. A hooking hole 73 is in the middle portion of the interlocking arm 67. In the hooking hole 73, one end side of the return spring 74 includes a tension coil spring is hooked. The other end portion of the return spring 74 is fastened to a bracket member 75 fixed to the rear portion of the support member 30. More specifically, a hooking hole 76 is located at the bottom of the bracket member 75, and the other end portion of the return spring 74 is hooked in the hooking hole 76. The force of the return spring 74 forces the interlocking arm 67 and the operation pedal 47 to pivot upward.

As shown in FIG. 10 and FIG. 11, the upward rocking of the interlocking arm 67 and the operation pedal 47 and the like is regulated by the relay arm 69, which will be described below, coming into contact with the stopper portion 21a provided in the first bracket 21L, and the operation pedal 47 is held at the first position Y1 (non-pressed position), which is the position before the operation pedal 47 is operated (pressed).

As shown in FIG. 10 and FIG. 11, the interlocking linkage 70 includes a cylindrical rod material, and one end portion (lower end portion) 70a is connected to the other end (rear) of the interlocking arm 67. In detail, the one-end portion 70a includes an axial center extending in the vehicle width direction and is connected to the interlocking linkage 70 freely for rotation around the axial center. The other end side portion (upper end portion) 70b of the interlocking linkage 70 is connected to one end (front) of the release arm 68. In detail, the other end side portion 70b includes an axial center extending in the vehicle width direction and is rotatably connected to the release arm 68 around the axial center.

As shown in FIG. 10 and FIG. 11, the release arm 68 is above the interlocking arm 67, and the other end (rear) side is pivoted to the first bracket 21L via a pivoting shaft 44. The release arm 68 is pulled down and pivoted downward via the interlocking arm 67 and the interlocking linkage 70 by depressing the control pedal 47. As described above, the lock member 43 pivots in conjunction with the downward pivoting of the release arm 68, causing the second engagement portion 41 to disengage from the first engagement portion 24 and unlock the lock by the tilt lock portion 20.

Thus, the release arm 68 releases the lock by the tilt lock portion 20 in conjunction with the operation of the operation pedal 47.

As shown in FIG. 11, the second interlocking portion 49B includes a first relay linkage 71, a relay arm 69, a second relay linkage 72, and a working member 51. The relay arm 69 is interlocked with the release arm 68 by the first relay linkage 71, and is interlocked with the working member 51 by the second relay link.

The first relay linkage 71 is made of a cylindrical rod material, and one end portion (lower end portion) 71a is connected to the release arm 68. In detail, the one-end portion 71a includes an axial center extending in the vehicle width direction and is rotatably connected to the front portion of the release arm 68 around the axial center. One end side portion 71a of the first relay linkage 71 is located forward of the other end portion 70b of the interlocking linkage 70. The other end side portion (upper end side portion) 71b of the first relay linkage 71 is connected to the one end (front) side of the relay arm 69. In detail, the other end side portion 71b includes an axial center extending in the vehicle width direction and is rotatably connected to the relay arm 69 around the axial center.

As shown in FIG. 10 and FIG. 11, the relay arm 69 is located above the release arm 68 and is pivoted to the first bracket 21L at the midpoint. In detail, a support cylinder 77 is fixed to the upper portion of the first bracket 21L, and the relay arm 69 is attached to this support cylinder 77 via an attachment member 78. The attachment member 78 includes an axial center X4 extending in the vehicle width direction, and the relay arm 69 is rotatably supported around the axial center of the attachment member 78. A backlash groove (mechanical play portion) 79 is on the other end (rear) of the relay arm 69. The backlash groove 79 is provided in a long groove that is elongated in the vertical direction and arc-shaped around the axis center X4 of the attachment member 78.

The second relay linkage 72 is made of a cylindrical rod material, and one end side portion (lower end portion) 72a is inserted into the backlash groove 79. In detail, the one-end portion 72a includes an axial center extending in the vehicle width direction and is inserted in the backlash groove 79, rotatable around the axial center and movable between one end and the other end in the longitudinal direction of the groove. The other end portion (upper end portion) 72b of the second relay linkage 72 is connected to the working member 51. In detail, the other end side portion 72b includes an axial center extending in the vehicle width direction and is rotatably connected to the working member 51 around the axial center.

The working member 51 supports the first lock member 33 in a movable manner up and down. The working member 51 is linked to the operation pedal 47 via the first interlocking portion 49A, the first relay linkage 71, the relay arm 69, and the second relay linkage 72, which unlocks the lock by the telescopic lock portion 20 in conjunction with the operation of the operation pedal 47.

As shown in FIG. 3 and FIG. 10, the working member 51 includes a first member 52 and a second member 53.

The first member 52 includes a first portion 52a located to the left of the first lock member 33, a second portion 52b extending posteriorly downward from the lower rear end portion of the first portion 52a, and a third portion 52c extending rightward from the rear end portion of the second portion 52b. The first portion 52a includes a guide groove 54 at the top and a boss 55 at the bottom. A roller 56 is fitted in the guide groove 54 with the roller 56 free to rotate around an axis extending in the vehicle width direction and free to move in the longitudinal direction of the groove. A pin 57 fixed to the upper portion 33A of the first lock member 33 is inserted into the roller 56. The boss 55 is located in the lower front portion of the guide groove 54. An insertion hole 58 is provided in the second portion 52B. In this insertion hole 58, the other end portion 72b of the second relay linkage 72 is inserted into the insertion hole 58.

As shown in FIG. 3 and FIG. 10, the second member 53 includes a first portion 53a located to the right of the first lock member 33, a second portion 53b extending posteriorly downward from the lower rear end portion of the first portion 53a, and a third portion 53c extending leftward from the rear end portion of the second portion 53b. Similar to the first member 52, the first portion 53a includes a guide groove 54 at the top and a boss 55 at the bottom. The roller 56 is fitted in the guide groove 54 with the roller 56 free to rotate around an axis extending in the vehicle width direction and free to move in the longitudinal direction of the groove. The pin 57 fixed to the upper portion 33A of the first lock member 33 is inserted into the roller 56 with relative rotational freedom. The boss 55 is located below the front portion of the guide groove 54.

Figure 12:
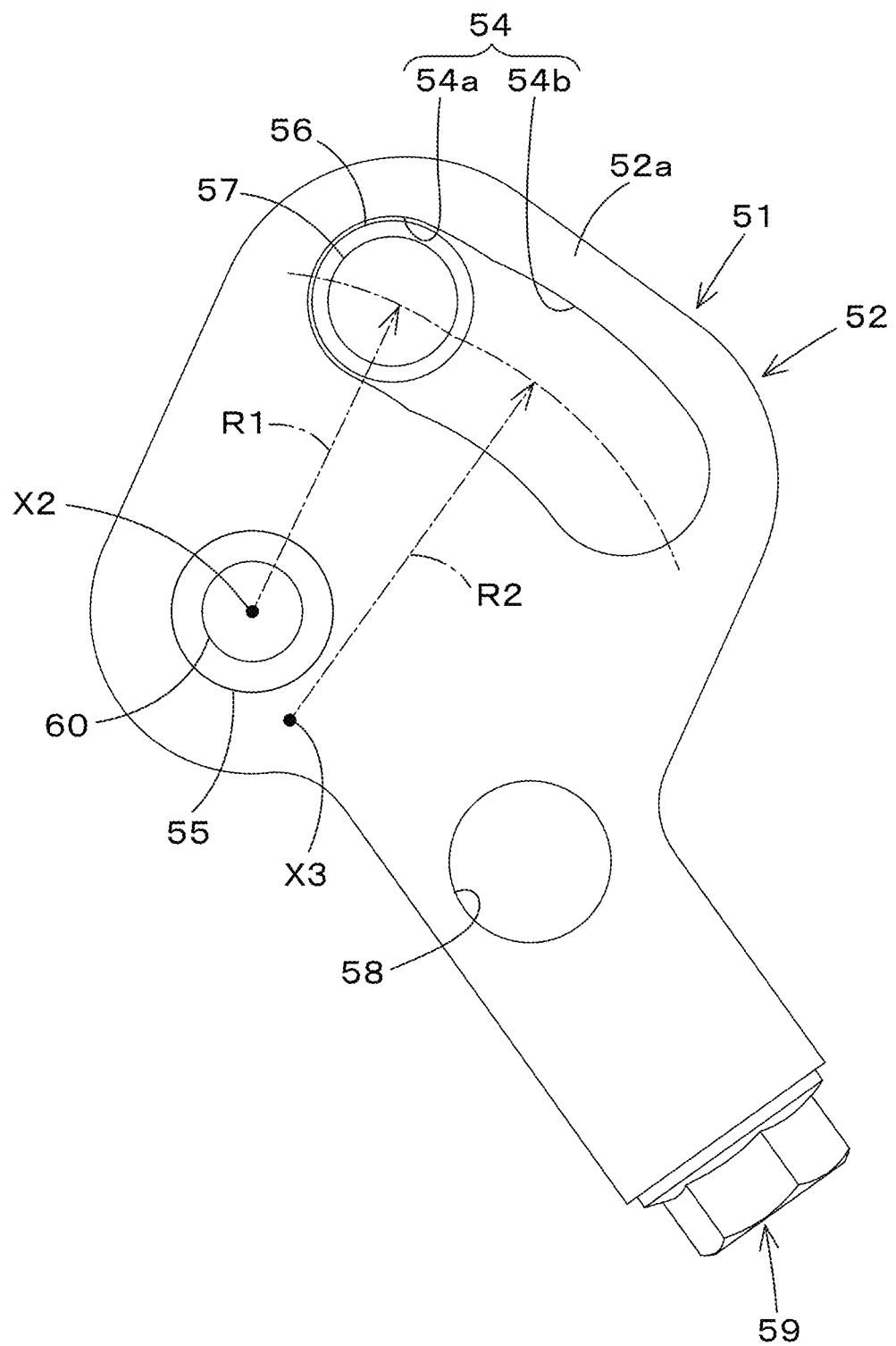
FIG. 12 is a side view of a working member.

As shown in FIG. 3, the third portion 52c and the third portion 53c are connected by a fastener tool 59 having a bolt and nut. As shown in FIG. 3 and FIG. 12, the boss 55 is attached to the upper portion of the outer sleeve 27A by an attachment member 60. The attachment member 60 includes an axial center X2 extending in the vehicle width direction, and the working member 51 is supported on the outer sleeve 27A by the outer sleeve 27A, which can be pivoted up and down around the axial center X2 of the attachment member 60.

As shown in FIG. 12, the guide groove 54 includes a lock portion 54a and an unlock portion 54b. The lock portion 54a is provided in an arc of radius R1 centered on the axial center X2 of the attachment member 60, and the unlock portion 54b is provided in an arc of radius R2 centered on the arc center X3, which is different from the axial center X2. The arc center X3 is a line extending in the vehicle width direction and is located behind and below the axial center X2.

Figure 13:
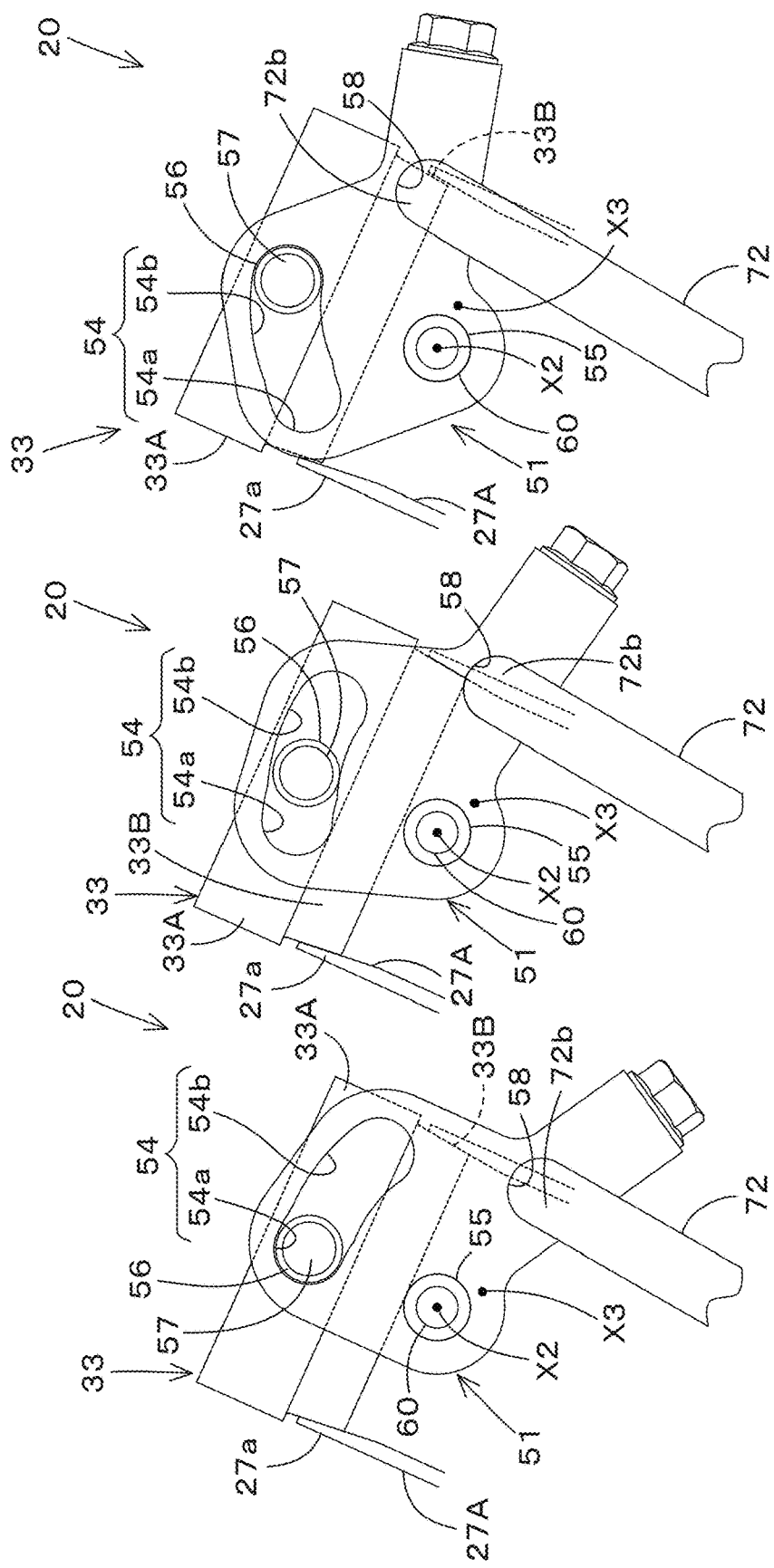
FIG. 13 is a side view illustrating an operation state of a telescopic lock portion.

The leftmost view in FIG. 13 shows the first lock member in the locking position. In this state, the roller 56 is located in the lock portion 54a of the guide groove 54. When the rear portion of the working member 51 is lifted up from this state, the working member 51 pivots upwardly about the axis center X2 and pushes the roller 56 up at the lower end portion of the unlock portion 54b, as shown in the center view in FIG. 13. This causes the first lock member 33 to move upward. Further, when the rear portion of the working member 51 is lifted up, the first lock member 33 moves upward until the roller 56 reaches the rear end portion of the guide groove 54, as shown in the rightmost view in FIG. 13, and the first lock member 33 is in the most lifted position. During the movement of the first lock member 33 from the locking position to the lifted position, the wedge effect by the first lock member 33 is released and the steering shaft 26 becomes adjustable in length.

FIG. 11 shows the state before operating the operation pedal 47, and the operation pedal 47 is in the first position Y1. In this state, the tilt lock portion 61 is in a locking state and the telescopic lock portion 20 is also in a locking state. That is, the steering shaft 26 is non-tiltable and non-retractable. With the operation pedal 47 located in the first position Y1, the one end side portion 72a of the second relay linkage 72 is located at the upper end portion of the backlash groove 79. The one end side portion 72a of the second relay linkage 72 is located near (the tilt axis) of the first tilt shaft 25L and the second tilt shaft 25R in side view.

Figure 14:
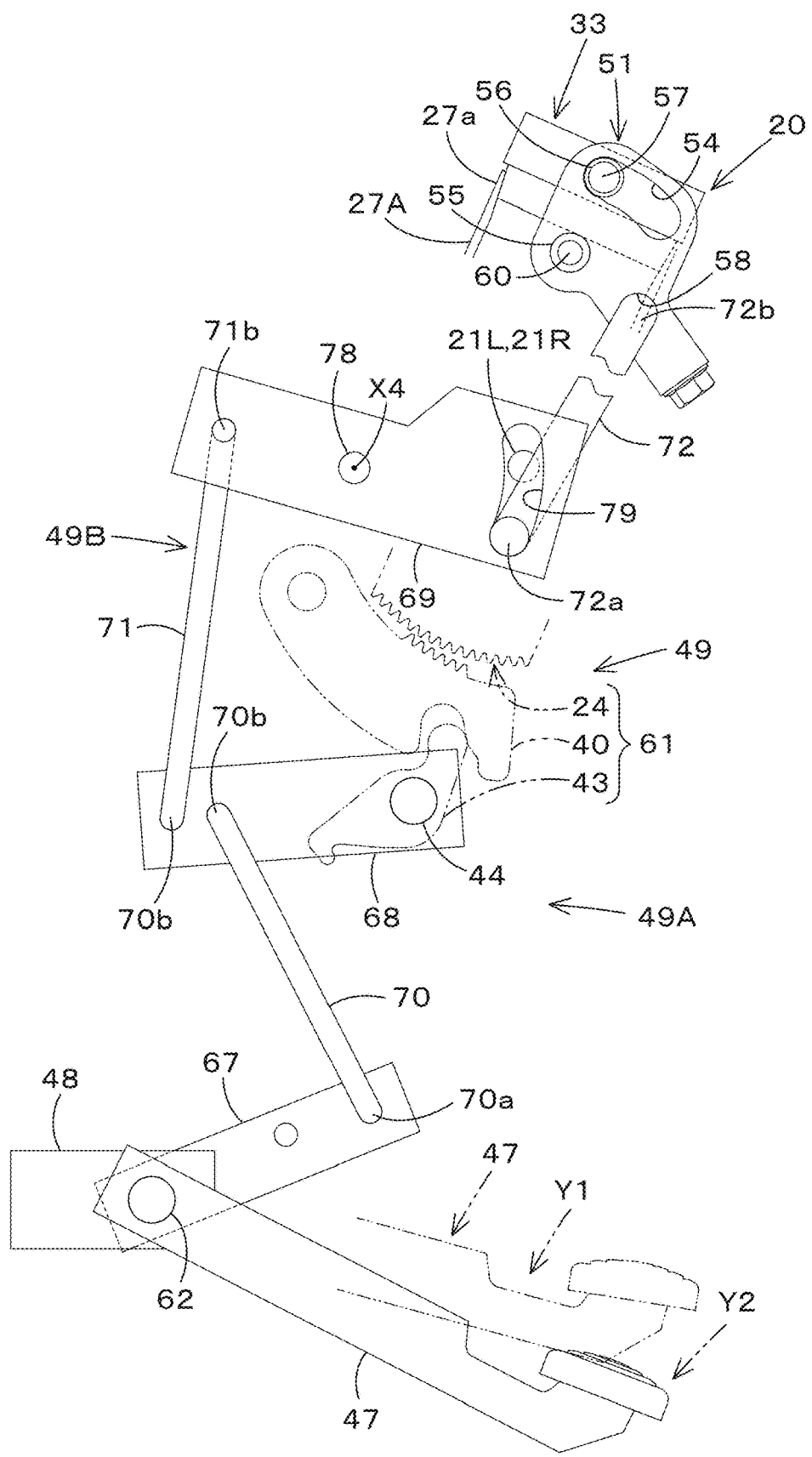
FIG. 14 is a side view of an interlocking mechanism in a case where an operation pedal is operated to a second position.

When the operation pedal 47 is depressed from this first position Y1, as shown in FIG. 14, the interlocking arm 67 pivots downward together with the operation pedal 47, and the interlocking linkage 70 is pulled down. Then, the front portion of the release arm 68 pivots downward and the lock member 43 pivots in conjunction with the pivoting of the release arm 68 thus removing the restriction of the lock member 43 on the second lock member 40. This releases the engagement of the first engagement portion 24 and the second engagement portion 41 thus allowing for tilt adjustment. In this tilt adjustment, the second relay linkage 72 pivots integrally with the steering shaft 26, but since one end side portion 72a of the second relay linkage 72 is located near the first tilt shaft 21L and the second tilt shaft 21R in side view, the second relay linkage 72 is allowed to pivot integrally with the steering shaft 26 due to the relative rotation and rattling between the one end side portion 72a and the backlash groove 79 and due to the relative rotation and rattling between the other end side portion 72b and the insertion hole 58.

On the other hand, when the first relay linkage 71 is pulled down by the downward pivoting of the release arm 68, the front portion of the relay arm 69 pivots downward and the rear portion pivots upward. At this time, the backlash groove 79 moves upward with respect to the one end side portion 72a. In other words, the one end side portion 72a of the second relay linkage 72 moves in the backlash groove 79 relative to the backlash groove 79. While this one-end side portion 72a moves relative to the lower end portion of the groove longitudinally in the backlash groove 79, the second relay linkage 72 is not lifted up, as shown in FIG. 14. As a result, the working member 51 does not pivot upward and the first lock member 33 does not move upward. In other words, the telescopic lock portion 20 remains locked.

As described above, the backlash groove 79 is a backlash groove that does not interlock the first interlocking portion 49A and the telescopic lock portion 20 until a predetermined amount of operation is performed from the position before operating the operation pedal 47.

When the operation pedal 47 is operated from the first position Y1 to the second position Y2 shown in FIG. 14, the lock is released by the tilt lock portion 61 but not by the telescopic lock portion 20. That is, the operation pedal 47 includes a second position Y2 that is operated from the first position Y1, which unlocks with the tilt lock portion 61 and does not unlock with the telescopic lock portion 20.

This second position Y2 is an arbitrary position within the operating range (operating area) of the operation pedal 47 between the position where the lock is released by the tilt lock portion 61 and the position before the position where the lock is released by the telescopic lock portion 20.

Figure 15:
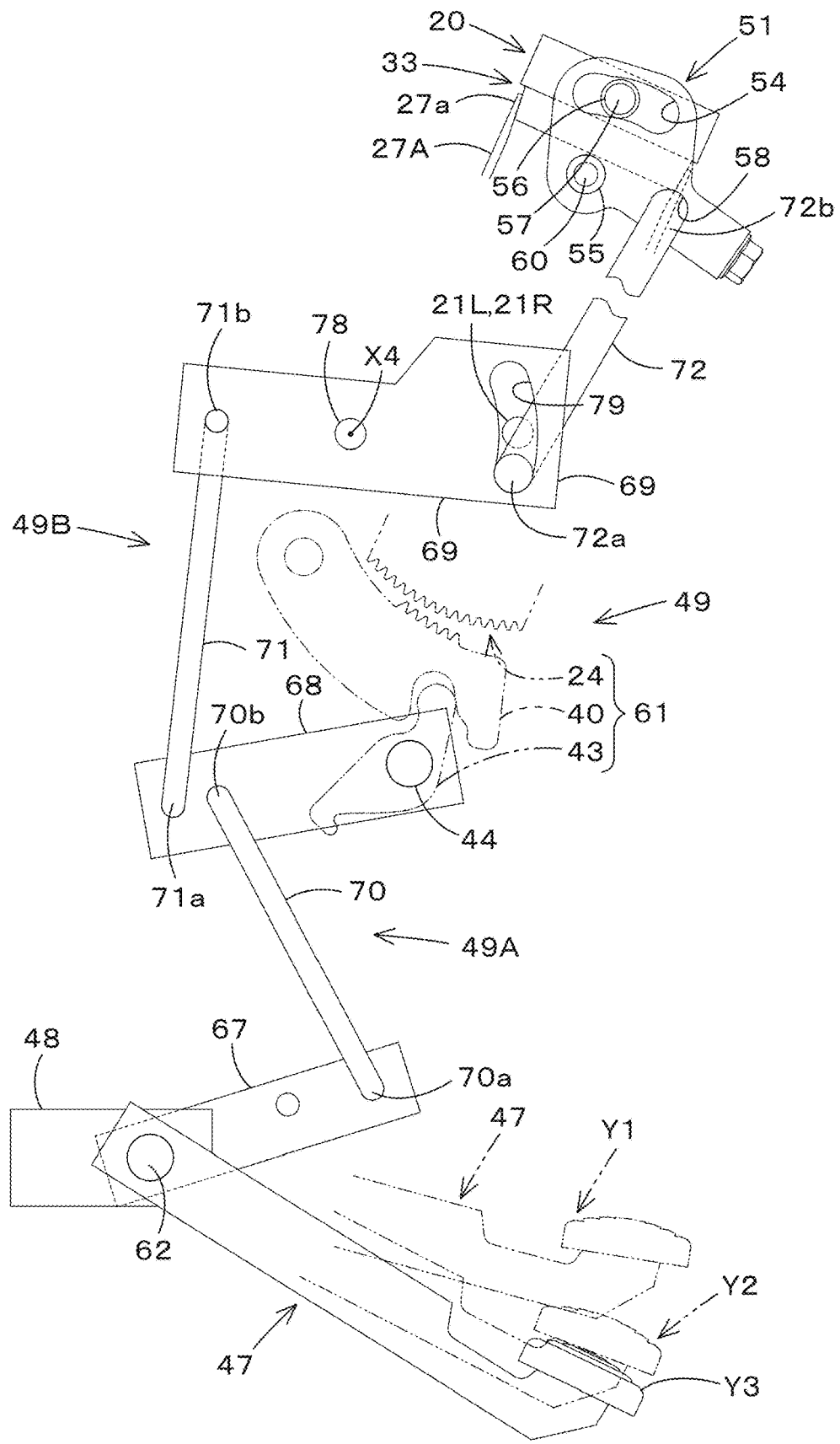
FIG. 15 is a side view of an interlocking mechanism in a case where an operation pedal is further operated from a second position.
Figure 16:
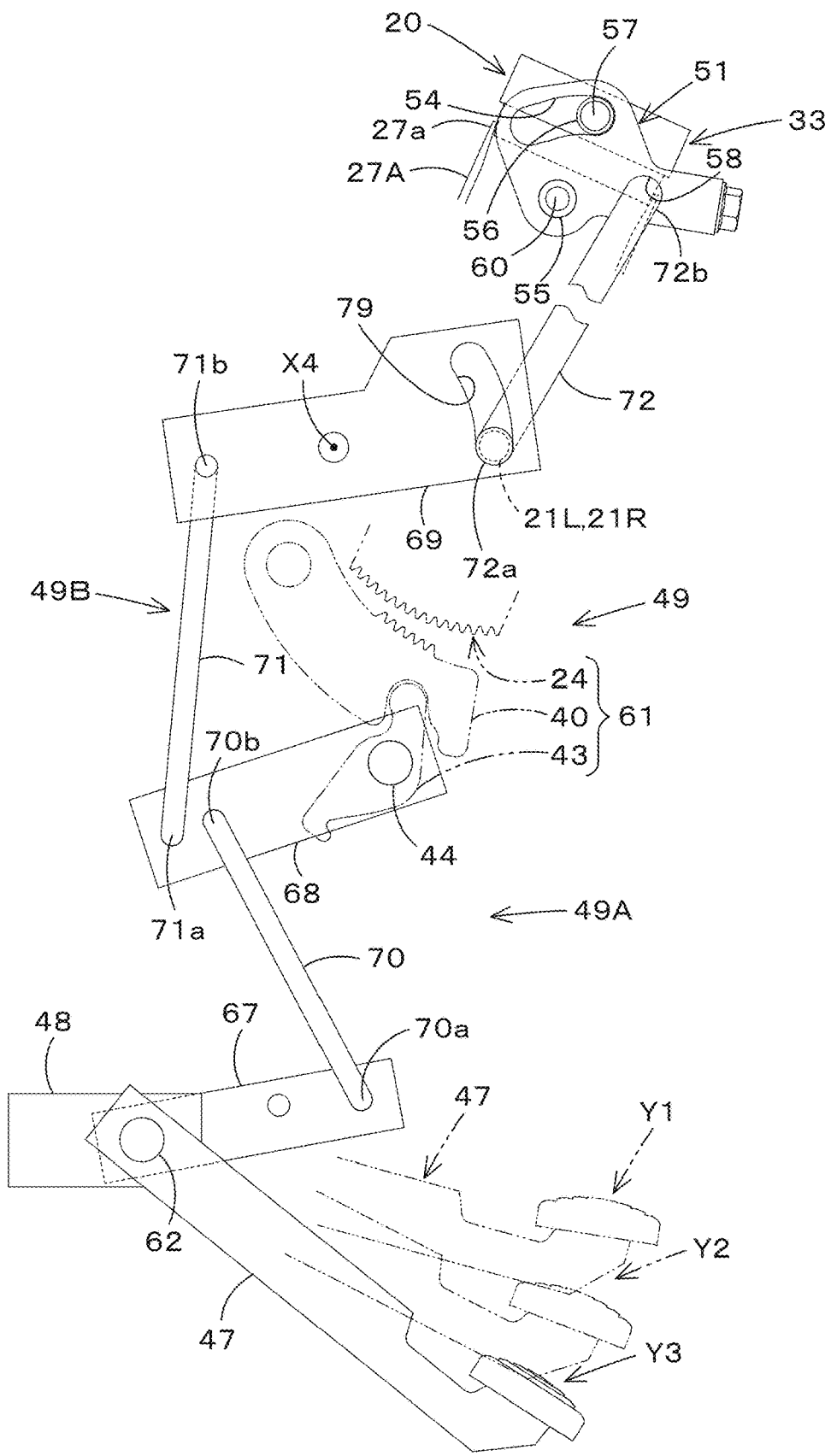
FIG. 16 is a side view of an interlocking mechanism in a case where an operation pedal is operated to a third position.

Next, when the operation pedal 47 is depressed from the second position Y2 shown in FIG. 14, the second relay linkage 72 moves upward in conjunction with the upward swinging of the rear portion of the relay arm 69, as shown in FIG. 15. In detail, when the lower end portion of the backlash groove 79 comes in contact with and lifts up the one-end portion 72a of the second relay linkage 72, the second relay linkage 72 moves upward. This causes the working member 51 to pivot upwardly around the attachment member 60 and pushes up the first lock member 33. Further, by depressing the operation pedal 47, as shown in FIG. 16, the first lock member 33 is lifted up to the highest lifted position by the upward movement of the second relay linkage 72 and the upward oscillation of the working member 51.

When the first lock member 33 moves upward to release the wedge effect, the lock by the tilt lock portion 61 and the lock by the telescopic lock portion 20 are released. Then, both the tilting and the length adjustment of the steering shaft 26 can be adjusted. In other words, further operation of the operation pedal 47 from the second position Y2 both unlocks by the tilt lock portion 61 and unlocks by the telescopic lock portion 20. That is, the operation pedal 47 includes a third position Y3, which is the position operated from the second position Y2 and which unlocks by the tilt lock portion 61 and the telescopic lock portion 20.

The third position Y is an arbitrary position within the operating range of the operation pedal 47, which is included in the operating region after the wedge effect by the first lock member 33 has been released. In other words, the operation pedal 47 includes an operating region for both unlocking by the tilt lock portion 61 and unlocking by the telescopic lock portion 20.

When releasing both the lock by the tilt lock portion 61 and the lock by the telescopic lock portion 20, the operation pedal 47 is usually depressed to the maximum extent.

As shown in FIG. 16, in the state where the first lock member 33 is in the most lifted position, the center of the one end side portion 72a of the second relay linkage 72 coincides with the tilt axis center X1. This allows for smooth tilt adjustment of the steering shaft 26.

When the lower end portion of the backlash groove 79 contacts the one-end side portion 72a of the second relay linkage 72 and pushes up the one-end side portion 72a, the force of the operation pedal 47 by the operator changes. This allows the operator to recognize that the operator is operating the operation pedal 47 in the third position Y3.

In the operation device 14 of the above configuration, a single operation pedal 47 can operate the tilt lock portion 61 and the telescopic lock portion 20 and can select one of the two adjustment patterns where only the tilt adjustment of the steering shaft 26 is performed and where both the tilt adjustment and length adjustment of the steering shaft 26 are performed. The selection of these adjustment patterns can be performed by a single operating pedal 47, which is convenient.

When an operator gets off the tractor 1, the operator often disembarks by releasing the lock by the tilt-lock portion 61 and lifting the steering handle 19 to the uppermost position thus widening a space between the operator seat 13 and the steering handle 19. When an operator gets in and out of the tractor 1, it is not necessary to adjust the length of the steering shaft 26 when the same operator gets in and out of the tractor 1 under a state where the length of the steering shaft 26 already has been adjusted, which only requires the tilt adjustment. In such a case, it is convenient to allow a case where only the tilt adjustment is required.

Also, when an operator different from one who last used the tractor 1 gets on the tractor 1, the tilt adjustment and length adjustments are necessary. In such a case, a case for both of the tilt and length adjustments can be selected.

The position of the backlash groove (mechanical play part) is not limited to that of the present preferred embodiment, but may be provided in the working member 51, for example. That is, the guide groove 54 may be an arc extending around the axial center X2 of the attachment member 60, and the guide groove 54 may be used as a mechanical play area. In this case, after the roller 56 moves to the back end portion of the guide groove 54, the working member 51 pivots upward to release the lock by the telescopic lock portion 20.

In the tractor 1 of the present preferred embodiment, the following advantageous effects are achieved.

The tractor (traveling vehicle) 1 includes the steering shaft 26 to which the steering handle 19 is attached, the steering shaft 26 that is adjustable in tilt angle and length, the tilt lock portion 61 that locks the steering shaft 26 to the adjusted tilt angle, the telescopic lock portion 20 which locks the steering shaft 26 to an adjusted length, and the operation member 47 which includes an operation area allowing locking of both of the tilt lock portion 61 and the telescopic lock portion 20 to be released.

According to this configuration, the releasing both of the lock by the tilt lock portion 61 and the lock by the telescopic lock portion 20 can be performed by the operation member 47, and the operability of adjusting the length and tilt angle of the steering shaft 26 can be improved.

The operation member 47 includes the first position Y1 which is the position before the operation, the second position Y2 which is the position operated from the first position Y1 and which unlocks with the tilt lock portion 61 and does not unlock with the telescopic lock portion 20, and the third position Y3 which is the position operated from the second position Y2 and which unlocks with the tilt lock portion 61 and the telescopic lock portion 20.

According to this configuration, it is convenient to select a case in which only the tilt adjustment of the steering shaft 26 is performed, or a case in which both of the tilt adjustment and length adjustment of the steering shaft 26 are performed.

In addition, the tractor 1 includes an interlocking mechanism 49 to interlock the operation member 47 with the tilt lock portion 61 and the telescopic lock portion 20. And, the interlocking mechanism 49 includes the first interlocking portion 49A to interlock the operation member 47 and the tilt lock portion 61, the second interlocking portion 49B to interlock the first interlocking portion 49A with the telescopic lock portion 20, and a mechanical play portion (backlash groove 79) that does not interlock the first interlocking portion 49A and the telescopic lock portion 20 until a predetermined amount of operation is performed from the position before the operation of the operation member 47.

According to this configuration, a structure that allows for the tilt and length adjustments of the steering shaft 26 with a single operation member 47 can be easily configured.

In addition, the first interlocking portion 49A includes the release arm 68 to release the lock by the tilt lock portion 61 in conjunction with operation of the operation member 47. And, the second interlocking portion 49B includes a working member 51 to release the lock by the telescopic lock portion 20 in conjunction with operation of the operation member 47, and the relay arm 69 interlocked with the release arm 68 by the first relay linkage 71 and interlocked with the working member 51 by the second relay linkage 72. The mechanical play portion (backlash groove 79) is provided to the relay arm 69 and includes a long groove to which one end portion 72a of the second relay linkage 72 is inserted, and the one end portion 72a relatively moves in the groove to prevent the relay arm 69 and the moving member 51 from being interlocked each other until the operation member 47 is moved in a predetermined distance, and further moves after the operation member 47 is moved in the predetermined distance such that an end portion of the long groove contacts to the one end portion 72a to interlock the relay arm 69 and the moving member 51.

According to this configuration, a structure that allows for the tilt and length adjustments of the steering shaft 26 with a single operation member 47 can be further easily configured.

In addition, the tractor 1 is provided with the tilt shaft (first tilt shaft 25L, second tilt shaft 25R), which is the center of the tilt movement of the steering shaft 26. And, the center of the axis of the tilt shaft (tilt axis center X1) of the tilt shaft coincides with the center of one end portion 72a of the second relay linkage 72 in a state where the tilt angle of the steering shaft 26 can be adjusted and the length of the steering shaft 26 can be adjusted.

According to this configuration, the tilt adjustment can be performed smoothly.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A traveling vehicle comprising:
a vehicle body;
an operator seat on the vehicle body;
a support member on the vehicle body in front of the operator seat;
a fixed bracket fixed to the support member;
a movable bracket supported on an upper portion of the fixed bracket such that the movable bracket is rotatable around a tilt shaft extending in a vehicle width direction;
an extendable steering post provided on the movable bracket;
a steering shaft to which a steering handle is attached, the steering shaft being supported on the steering post and adjustable in tilt angle by rotation of the movable bracket around the tilt shaft and adjustable in length by being extended and shortened integrally with the steering post;
a tilt lock to lock the steering shaft at an adjusted tilt angle by regulating rotation of the movable bracket around the tilt shaft relative to the fixed bracket;
a telescopic lock to lock the steering shaft at an adjusted length by regulating extension and shortening of the steering post;
an operator including an operation area to allow locking by both of the tilt lock and the telescopic lock to be released; and
an interlocking mechanism to interlock the operator with the tilt lock and the telescopic lock; wherein
the operator includes an operation pedal to be operated by being depressed, the operation pedal being provided on a lower portion of the fixed bracket; and
the interlocking mechanism includes:
a first interlocking portion which interlocks the operation pedal with the tilt lock and which, by depression of the operation pedal from a first position to a second position, releases the locking by the tilt lock without releasing the locking by the telescopic lock, the first position being a position before operation; and
a second interlocking portion which interlocks the first interlocking portion with the telescopic lock and which, by depression of the operation pedal from the second position to a third position, releases the locking by the telescopic lock with the locking by the tilt lock being released.

2. The traveling vehicle according to claim 1, wherein the second interlocking portion includes:
- a moving body to be moved in synchronization with operation of the operation pedal to release the locking by the telescopic lock; and
- a relay arm interlocked with the first interlocking portion by a first relay linkage and interlocked with the moving body by a second relay linkage; and
- a center of one end portion of the second relay linkage coincides with an axis of the tilt shaft in a state in which the tilt angle of the steering shaft is adjustable and the length of the steering shaft is adjustable, the one end portion being pivotably connected to the relay arm.

3. The traveling vehicle according to claim 2, wherein the interlocking mechanism includes:
- a mechanical play portion to prevent the first interlocking portion and the telescopic lock from being interlocked with each other until the operator is moved predetermined distance from a position at which the operator is not moved.

4. The traveling vehicle according to claim 1, wherein the interlocking mechanism includes:
- a mechanical play portion to prevent the first interlocking portion and the telescopic lock from being interlocked with each other until the operator is moved a predetermined distance from a position at which the operator is not moved.

5. The traveling vehicle according to claim 4, wherein the first interlocking portion includes:
- a release arm to be moved in synchronization with operation of the operator to release the locking by the tilt lock;

the second interlocking portion includes:
- a moving body to be moved in synchronization with the operation of the operator to release the locking by the telescopic lock; and
- a relay arm interlocked with the release arm by a first relay linkage and interlocked with the moving body by a second relay linkage;

the mechanical play portion is provided to the relay arm and includes a groove to which one end portion of the second relay linkage is inserted; and the one end portion relatively moves in the groove to prevent the relay arm and the moving body from being interlocked each other until the operator is moved in a predetermined distance, and further moves after the operator is moved in the predetermined distance such that an end portion of the groove contacts to the one end portion to interlock the relay arm and the moving body.

6. A traveling vehicle comprising:
- a steering shaft to which a steering handle is attached, the steering shaft being adjustable in tilt angle and length;
- a tilt lock to lock the steering shaft at an adjusted tilt angle;
- a telescopic lock to lock the steering shaft at an adjusted length;
- an operator including an operation area to allow locking by both of the tilt lock and the telescopic lock to be released; and
- an interlocking mechanism to interlock the operator with the tilt lock and the telescopic lock, the interlocking mechanism including:
    - a first interlocking portion to interlock the operator and the tilt lock;
    - a second interlocking portion to interlock the first interlocking portion and the telescopic lock; and
    - a mechanical play portion to prevent the first interlocking portion and the telescopic lock from being interlocked with each other until the operator is moved a predetermined distance from a position at which the operator is not moved; wherein the first interlocking portion includes:
- a release arm to be moved in synchronization with operation of the operator to release the locking by the tilt lock;

the second interlocking portion includes:
- a moving body to be moved in synchronization with operation of the operator to release the locking by the telescopic lock; and
- a relay arm interlocked with the release arm by a first relay linkage and interlocked with the moving body by a second relay linkage;

the mechanical play portion is provided to the relay arm and includes a groove to which one end portion of the second relay linkage is inserted; and the one end portion relatively moves in the groove to prevent the relay arm and the moving body from being interlocked each other until the operator is moved in a predetermined distance, and further moves after the operator is moved in the predetermined distance such that an end portion of the groove contacts to the one end portion to interlock the relay arm and the moving body.

7. The traveling vehicle according to claim 6, further comprising:
- a tilt shaft defining a center of an inclining movement of the steering shaft; wherein
- a center of the one end portion of the second relay linkage coincides with an axis of the tilt shaft under a state where the tilt angle of the steering shaft is adjustable and the length of the steering shaft is adjustable.

8. The traveling vehicle according to claim 5, wherein
- the tilt shaft defines a center of an inclining movement of the steering shaft; and
- a center of the one end portion of the second relay linkage coincides with an axis of the tilt shaft under a state where the tilt angle of the steering shaft is adjustable and the length of the steering shaft is adjustable.

* * * * *